United States Patent
Tekle et al.

(10) Patent No.: US 10,108,968 B1
(45) Date of Patent: Oct. 23, 2018

(54) APPARATUS, METHOD AND ARTICLE TO FACILITATE AUTOMATIC DETECTION AND REMOVAL OF FRAUDULENT ADVERTISING ACCOUNTS IN A NETWORK ENVIRONMENT

(71) Applicant: PLENTYOFFISH MEDIA INC., Vancouver (CA)

(72) Inventors: Fitsum Tekle, Surrey (CA); Steve Oldridge, Vancouver (CA); Thomas Levi, Vancouver (CA)

(73) Assignee: PLENTYOFFISH MEDIA ULC, Vancouver (CA)

( * ) Notice: Subject to any disclaimer, the term of this patent is extended or adjusted under 35 U.S.C. 154(b) by 569 days.

(21) Appl. No.: 14/638,225

(22) Filed: Mar. 4, 2015

Related U.S. Application Data

(60) Provisional application No. 61/948,159, filed on Mar. 5, 2014.

(51) Int. Cl.
*G06Q 30/00* (2012.01)
*G06Q 30/02* (2012.01)
*G06Q 40/00* (2012.01)

(52) U.S. Cl.
CPC ..... *G06Q 30/0185* (2013.01); *G06Q 30/0241* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 5,583,763 A | 12/1996 | Atcheson et al. | |
| 5,724,521 A | 3/1998 | Dedrick | |

(Continued)

FOREIGN PATENT DOCUMENTS

| | | | | |
|---|---|---|---|---|
| WO | WO-2008030670 A1 | * | 3/2008 | ............. G06Q 30/02 |

OTHER PUBLICATIONS

Brammer, Michelle. Who Commits Online Advertising Fraud and How to Stop It. (Sep. 21, 2015) http://blog.ezanga.com/blog/who-commits-online-advertising-fraud-and-how-to-stop-it. Retrieved online Jun. 16, 2018. (Year: 2015).*

Alsaleh et al., "Improving Matching Process in Social Network Using Implicit and Explicit User Information," *Web Technologies and Applications* 313-320, 2011.

Frind et al. "Systems and Methods for Training and Employing a Machine Learning System in Evaluating Entity Pairs," Office Action, dated Aug. 16, 2016, for U.S. Appl. No. 14/163,849, 60 pages.

Kuchka et al., "Apparatus, Method and Article to Identify Discrepancies Between Clients and in Response Prompt Clients in a Networked Environment," Amendment, Filed Aug. 4, 2016, for U.S. Appl. No. 14/204,939, 38 pages.

(Continued)

*Primary Examiner* — James A Reagan
(74) *Attorney, Agent, or Firm* — Seed Intellectual Property Law Group LLP

(57) ABSTRACT

A fraudulent advertiser account detection system may be used by a Website operator to identify active advertiser accounts as at least one of either a known valid advertiser account or a known fraudulent advertiser account. Each advertiser account has a logically associated account profile. Each account profile includes a number of advertiser attributes, each attribute having one or more logically associated attribute values characterizing the respective advertiser. Using a plurality of known valid advertiser accounts and plurality of known fraudulent advertiser accounts, the system determines a number of initial probabilities and likelihoods that one or more attribute values and/or attribute value combinations present in an advertiser account profile indicate at least one of a known valid or a known fraudulent advertiser account. Using these probabilities and likelihoods, the system determines for each advertiser account a conditional probability value indicative of whether the respective account is a fraudulent advertiser account.

27 Claims, 9 Drawing Sheets

(56) References Cited

U.S. PATENT DOCUMENTS

| | | | |
|---|---|---|---|
| 5,749,091 A | 5/1998 | Ishida et al. | |
| 5,963,951 A | 10/1999 | Collins | |
| 6,006,225 A | 12/1999 | Bowman et al. | |
| 6,018,738 A | 1/2000 | Breese et al. | |
| 6,038,295 A | 3/2000 | Mattes | |
| 6,041,311 A | 3/2000 | Chislenko et al. | |
| 6,049,777 A | 4/2000 | Sheena et al. | |
| 6,058,367 A | 5/2000 | Sutcliffe et al. | |
| 6,061,681 A | 5/2000 | Collins | |
| 6,064,980 A | 5/2000 | Jacobi et al. | |
| 6,134,532 A | 10/2000 | Lazarus et al. | |
| 6,169,986 B1 | 1/2001 | Bowman et al. | |
| 6,199,067 B1 | 3/2001 | Geller | |
| 6,266,649 B1 | 7/2001 | Linden et al. | |
| 6,356,879 B2 | 3/2002 | Aggarwal et al. | |
| 6,542,749 B2 | 4/2003 | Tanaka et al. | |
| 6,735,568 B1 | 5/2004 | Buckwalter et al. | |
| 6,772,150 B1 | 8/2004 | Whitman et al. | |
| 6,782,370 B1 | 8/2004 | Stack | |
| 6,783,065 B2 | 8/2004 | Spitz et al. | |
| 6,853,982 B2 | 2/2005 | Smith et al. | |
| 6,912,505 B2 | 6/2005 | Linden et al. | |
| 7,113,917 B2 | 9/2006 | Jacobi et al. | |
| 7,240,353 B2 | 7/2007 | Lau et al. | |
| 7,313,536 B2 | 12/2007 | Westphal | |
| 7,324,998 B2 | 1/2008 | Beres et al. | |
| 7,562,814 B1 | 7/2009 | Shao et al. | |
| 7,873,695 B2 * | 1/2011 | Clegg | H04L 51/12 709/206 |
| 8,122,142 B1 | 2/2012 | Svendsen et al. | |
| 8,180,765 B2 | 5/2012 | Nicolov | |
| 8,225,413 B1 | 7/2012 | De et al. | |
| 8,499,247 B2 | 7/2013 | Niyogi et al. | |
| 8,566,938 B1 | 10/2013 | Prakash et al. | |
| 8,577,874 B2 | 11/2013 | Svendsen et al. | |
| 8,620,790 B2 | 12/2013 | Priebatsch | |
| 8,626,663 B2 | 1/2014 | Nightingale et al. | |
| 8,775,284 B1 * | 7/2014 | Crook | G06Q 30/06 235/379 |
| 8,825,802 B2 | 9/2014 | Pearce | |
| 8,930,398 B1 | 1/2015 | Kishore et al. | |
| 9,047,611 B2 | 6/2015 | Krishnamoorthy et al. | |
| 9,069,945 B2 | 6/2015 | Singh | |
| 9,160,742 B1 * | 10/2015 | Ackerman | H04L 63/0853 |
| 9,218,468 B1 | 12/2015 | Rappaport | |
| 9,219,704 B2 | 12/2015 | Hamlin et al. | |
| 9,536,221 B2 | 1/2017 | Frind | |
| 9,537,706 B2 | 1/2017 | Frind et al. | |
| 9,537,814 B2 * | 1/2017 | Rubinstein | H04L 51/32 |
| 9,672,289 B1 | 6/2017 | Frind et al. | |
| 9,679,259 B1 | 6/2017 | Frind et al. | |
| 9,733,811 B2 | 8/2017 | Rad et al. | |
| 2002/0091972 A1 | 7/2002 | Harris et al. | |
| 2002/0095303 A1 | 7/2002 | Asayama et al. | |
| 2002/0156632 A1 | 10/2002 | Haynes et al. | |
| 2002/0184080 A1 | 12/2002 | Murad et al. | |
| 2003/0065632 A1 | 4/2003 | Hubey | |
| 2003/0065635 A1 | 4/2003 | Sahami et al. | |
| 2003/0093405 A1 | 5/2003 | Mayer | |
| 2003/0234519 A1 | 12/2003 | Farmer | |
| 2004/0012638 A1 | 1/2004 | Donnelli et al. | |
| 2004/0107283 A1 | 6/2004 | Paddon | |
| 2004/0210640 A1 * | 10/2004 | Chadwick | H04L 51/12 709/207 |
| 2004/0230527 A1 | 11/2004 | Hansen et al. | |
| 2004/0260781 A1 | 12/2004 | Shostack et al. | |
| 2005/0027707 A1 | 2/2005 | Syed | |
| 2005/0080857 A1 * | 4/2005 | Kirsch | H04L 51/12 709/206 |
| 2005/0108227 A1 | 5/2005 | Russell-Falla et al. | |
| 2005/0108344 A1 | 5/2005 | Tafoya et al. | |
| 2005/0240608 A1 | 10/2005 | Jones et al. | |
| 2006/0018522 A1 | 1/2006 | Sunzeri et al. | |
| 2006/0059142 A1 | 3/2006 | Zvinyatskovsky et al. | |
| 2006/0149766 A1 | 7/2006 | Ghoting et al. | |
| 2006/0256959 A1 | 11/2006 | Hymes | |
| 2007/0005587 A1 | 1/2007 | Johnson et al. | |
| 2007/0061334 A1 | 3/2007 | Ramer et al. | |
| 2007/0112792 A1 | 5/2007 | Majumder | |
| 2007/0129999 A1 * | 6/2007 | Zhou | G06Q 30/0248 705/14.47 |
| 2007/0156664 A1 | 7/2007 | Norton et al. | |
| 2007/0206917 A1 | 9/2007 | Ono et al. | |
| 2007/0233603 A1 | 10/2007 | Schmidgall et al. | |
| 2007/0265962 A1 | 11/2007 | Bowie, Jr. et al. | |
| 2007/0282621 A1 | 12/2007 | Altman et al. | |
| 2008/0039121 A1 | 2/2008 | Muller et al. | |
| 2008/0086534 A1 | 4/2008 | Bardak et al. | |
| 2008/0103971 A1 | 5/2008 | Lukose et al. | |
| 2008/0140576 A1 | 6/2008 | Lewis et al. | |
| 2008/0189122 A1 | 8/2008 | Coletrane et al. | |
| 2009/0016507 A1 | 1/2009 | Altberg et al. | |
| 2009/0044279 A1 | 2/2009 | Crawford et al. | |
| 2009/0066722 A1 | 3/2009 | Kriger et al. | |
| 2009/0094048 A1 | 4/2009 | Wallace et al. | |
| 2009/0106043 A1 | 4/2009 | Buckwalter et al. | |
| 2009/0144329 A1 | 6/2009 | Marlow | |
| 2009/0164464 A1 | 6/2009 | Carrico et al. | |
| 2009/0216734 A1 | 8/2009 | Aghajanyan et al. | |
| 2009/0248599 A1 | 10/2009 | Hueter et al. | |
| 2009/0299645 A1 | 12/2009 | Colby et al. | |
| 2010/0002920 A1 | 1/2010 | Cosatto et al. | |
| 2010/0036806 A1 | 2/2010 | Lam et al. | |
| 2010/0094767 A1 * | 4/2010 | Miltonberger | G06Q 10/067 705/325 |
| 2010/0114614 A1 | 5/2010 | Sharpe | |
| 2010/0145869 A1 | 6/2010 | Brown | |
| 2010/0169376 A1 | 7/2010 | Chu | |
| 2010/0262611 A1 | 10/2010 | Frind | |
| 2010/0318544 A1 | 12/2010 | Nicolov | |
| 2011/0082824 A1 | 4/2011 | Allison et al. | |
| 2011/0107260 A1 | 5/2011 | Park et al. | |
| 2011/0131085 A1 | 6/2011 | Wey | |
| 2011/0145238 A1 | 6/2011 | Stork | |
| 2011/0167059 A1 | 7/2011 | Fallah | |
| 2011/0178881 A1 | 7/2011 | Pulletikurty | |
| 2011/0191768 A1 | 8/2011 | Smith | |
| 2011/0208737 A1 | 8/2011 | Shmueli et al. | |
| 2011/0219310 A1 | 9/2011 | Robson | |
| 2011/0231396 A1 | 9/2011 | Dhara et al. | |
| 2011/0270813 A1 | 11/2011 | Cok et al. | |
| 2011/0306028 A1 | 12/2011 | Galimore | |
| 2012/0059850 A1 | 3/2012 | Bent et al. | |
| 2012/0088524 A1 | 4/2012 | Moldavsky et al. | |
| 2012/0089618 A1 | 4/2012 | Anschutz et al. | |
| 2012/0102410 A1 | 4/2012 | Gewecke et al. | |
| 2012/0109959 A1 | 5/2012 | Benhadda | |
| 2012/0110085 A1 | 5/2012 | Malik et al. | |
| 2012/0123828 A1 | 5/2012 | Pahls et al. | |
| 2012/0151417 A1 | 6/2012 | Wong et al. | |
| 2012/0158586 A1 | 6/2012 | Ganti et al. | |
| 2012/0166285 A1 | 6/2012 | Shapiro et al. | |
| 2012/0190386 A1 | 7/2012 | Anderson | |
| 2012/0197802 A1 * | 8/2012 | Smith | G06Q 20/12 705/44 |
| 2012/0198002 A1 | 8/2012 | Goulart et al. | |
| 2012/0284341 A1 | 11/2012 | Masood et al. | |
| 2013/0097246 A1 | 4/2013 | Zifroni et al. | |
| 2013/0138741 A1 | 5/2013 | Redstone et al. | |
| 2013/0212680 A1 * | 8/2013 | Winn | H04L 51/12 726/23 |
| 2013/0247149 A1 * | 9/2013 | Sanft | G06F 21/31 726/4 |
| 2013/0262984 A1 | 10/2013 | Mehr et al. | |
| 2013/0282745 A1 | 10/2013 | Mishra et al. | |
| 2013/0297590 A1 | 11/2013 | Zukovsky et al. | |
| 2013/0325948 A1 | 12/2013 | Chen et al. | |
| 2014/0052861 A1 | 2/2014 | Frind et al. | |
| 2014/0058763 A1 | 2/2014 | Zizzamia et al. | |
| 2014/0079297 A1 | 3/2014 | Tadayon et al. | |
| 2014/0095598 A1 | 4/2014 | Schornack et al. | |
| 2014/0095603 A1 | 4/2014 | Bhardwaj et al. | |
| 2014/0122628 A1 | 5/2014 | Yao et al. | |
| 2014/0136933 A1 | 5/2014 | Berger et al. | |

(56) References Cited

U.S. PATENT DOCUMENTS

| | | |
|---|---|---|
| 2014/0156750 A1 | 6/2014 | De Cristofaro et al. |
| 2014/0207637 A1 | 7/2014 | Groarke |
| 2015/0120583 A1 | 4/2015 | Zarrella |
| 2015/0161649 A1 | 6/2015 | Eggleston et al. |
| 2015/0348208 A1 | 12/2015 | Nordyke et al. |
| 2015/0379574 A1 | 12/2015 | Pattan et al. |
| 2016/0292688 A1 | 10/2016 | Barton et al. |

OTHER PUBLICATIONS

Kuchka et al., "Apparatus, Method and Article to Identify Discrepancies Between Clients and in Response Prompt Clients in a Networked Environment," Office Action, dated Sep. 8, 2016, for U.S. Appl. No. 14/204,939, 104 pages.
Fiore et al., "Assessing Attractiveness in Online Dating Profiles," *CHI 2008 Proceedings—Friends, Foe, and Family*, pp. 797-806, 2008.
Frind et al., "Apparatus, Method and Article to Facilitate Matching of Clients in a Networked Environment," Response, filed Jul. 21, 2016, for U.S. Appl. No. 13/971,483, 21 pages.
Notice of Allowance, dated Aug. 24, 2016, for U.S. Appl. No. 12/488,512, Frind, "System and Method for Adaptive Matching of User Profiles Based on Viewing and Contact Activity for Social Relationship Services," 20 pages.
Office Action, dated Sep. 20, 2016, for U.S. Appl. No. 14/339,328, Frind et al., "Apparatus, Method and Article to Facilitate Matching of Clients in a Networked Environment," 30 pages.
"Binary search tree," Wikipedia, retrieved on Feb. 24, 2015, from http://en.wikipedia.org/wiki/Binary_search_tree, 11 pages.
"Chargeback," Wikipedia, retrieved on Feb. 24, 2015, from http://en.wikipedia.org/wiki/Chargeback, 4 pages.
"Merchant account," Wikipedia, retrieved on Feb. 24, 2015, from http://en.wikipedia.org/wiki/Merchant_account, 10 pages.
"Understanding Chargebacks: A Guide to Chargebacks for Online Merchants," DalPay, retrieved on Feb. 24, 2015, from https://www.dalpay.com/en/support/chargebacks.html, 6 pages.
Frind et al., "Apparatus, Method and Article to Facilitate Matching of Clients in a Networked Environment," U.S. Appl. No. 14/339,328, filed Jul. 23, 2014, 135 pages.
Frind et al., "Apparatus, Method and Article to Facilitate Matching of Clients in a Networked Environment," Preliminary Amendment filed Jul. 23, 2014, for U.S. Appl. No. 14/339,328, 11 pages.
Frind et al., "Systems and Methods for Training and Employing a Machine Learning System in Evaluating Entity Pairs," U.S. Appl. No. 14/163,849, filed Jan. 24, 2014, 75 pages.
Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.
Frind, "System and Method for Adaptive Matching of User Profiles Based on Viewing and Contact Activity for Social Relationship Services," Office Action dated Aug. 16, 2011, for U.S. Appl. No. 12/488,512, 14 pages.
Frind, "System and Method for Adaptive Matching of User Profiles Based on Viewing and Contact Activity for Social Relationship Services," Amendment filed Nov. 16, 2011, for U.S. Appl. No. 12/488,512, 16 pages.
Frind, "System and Method for Adaptive Matching of User Profiles Based on Viewing and Contact Activity for Social Relationship Services," Office Action dated Mar. 5, 2012, for U.S. Appl. No. 12/488,512, 19 pages.
Frind, "System and Method for Adaptive Matching of User Profiles Based on Viewing and Contact Activity for Social Relationship Services," Amendment filed May 24, 2012, for U.S. Appl. No. 12/488,512, 20 pages.
Frind, "System and Method for Adaptive Matching of User Profiles Based on Viewing and Contact Activity for Social Relationship Services," Office Action dated May 19, 2014, for U.S. Appl. No. 12/488,512, 20 pages.
Frind, "System and Method for Adaptive Matching of User Profiles Based on Viewing and Contact Activity for Social Relationship Services," Amendment filed Aug. 12, 2014, for U.S. Appl. No. 12/488,512, 11 pages.
Frind, "System and Method for Adaptive Matching of User Profiles Based on Viewing and Contact Activity for Social Relationship Services," Office Action dated Nov. 18, 2014, for U.S. Appl. No. 12/488,512, 17 pages.
Frind, "System and Method for Adaptive Matching of User Profiles Based on Viewing and Contact Activity for Social Relationship Services," Amendment filed Jan. 6, 2015, for U.S. Appl. No. 12/488,512, 12 pages.
Frind, "System and Method for Adaptive Matching of User Profiles Based on Viewing and Contact Activity for Social Relationship Services," Amendment filed Feb. 13, 2015, for U.S. Appl. No. 12/488,512, 12 pages.
Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.
Levi et al., "Apparatus, Method and Article to Effect User Interest-Based Matching in a Network Environment," U.S. Appl. No. 14/668,808, filed Mar. 25, 2015, 111 pages.
Levi et al., "Apparatus, Method and Article to Facilitate Automatic Detection and Removal of Fraudulent User Information in a Network Environment," U.S. Appl. No. 14/561,004, filed Dec. 4, 2014, 89 pages.
MacKinnon, "Apparatus, Method and Article to Facilitate Exchange of Messages in a Network Environment," U.S. Appl. No. 14/575,888, filed Dec. 18, 2014, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al., "Apparatus, Method and Article to Predict and Prevent Chargebacks in a Network Environment," U.S. Appl. No. 14/679,792, filed Apr. 6, 2015, 69 pages.
Oldridge et al., "Systems and Methods for Training and Employing a Machine Learning System in Providing Service Level Upgrade Offers," U.S. Appl. No. 14/672,749, filed Mar. 30, 2015, 95 pages.
Therneau et al., "An Introduction to Recursive Partitioning Using the RPART Routines," Mayo Clinic, Feb. 24, 2015, 62 pages.
Frind et al., "Apparatus, Method and Article to Facilitate Matching of Clients in a Networked Environment," Amendment filed Dec. 8, 2015, for U.S. Appl. No. 13/971,483, 33 pages.
Frind et al., "Apparatus, Method and Article to Facilitate Matching of Clients in a Networked Environment," Office Action, dated Apr. 6, 2016, for U.S. Appl. No. 13/971,483, 26 pages.
Frind et al. "Apparatus, Method and Article to Facilitate Matching of Clients in a Networked Environment," Office Action, dated Sep. 21, 2015, for U.S. Appl. No. 13/971,483, 25 pages.
Frind et al., "Apparatus, Method and Article to Facilitate Matching of Clients in a Networked Environment," U.S. Appl. No. 61/857,617, filed Jul. 23, 2013, 138 pages.
Frind et al., "Apparatus, Method and Article to Facilitate Matching of Clients in a Networked Environment," U.S. Appl. No. 61/691,082, filed Aug. 20, 2012, 131 pages.
Frind, "System and Method for Adaptive Matching of User Profiles Based on Viewing and Contact Activity for Social Relationship Services," Amendment filed Sep. 24, 2015, for U.S. Appl. No. 12/488,512, 14 pages.
Frind, "System and Method for Adaptive Matching of User Profiles Based on Viewing and Contact Activity for Social Relationship Services," Amendment filed Mar. 11, 2016, for U.S. Appl. No. 12/488,512, 15 pages.
Frind, "System and Method for Adaptive Matching of User Profiles Based on Viewing and Contact Activity for Social Relationship Services," Office Action, dated Jun. 24, 2015, for U.S. Appl. No. 12/488,512, 19 pages.

(56) References Cited

OTHER PUBLICATIONS

Frind, "System and Method for Adaptive Matching of User Profiles Based on Viewing and Contact Activity for Social Relationship Services," Office Action, dated Nov. 12, 2015, for U.S. Appl. No. 12/488,512, 21 pages.
Frind et al., "Systems and Methods for Training and Employing a Machine Learning System in Evaluating Entity Pairs," Amendment filed May 27, 2016, for U.S. Appl. No. 14/163,849, 23 pages.
Frind et al., "Systems and Methods for Training and Employing a Machine Learning System in Evaluating Entity Pairs," Office Action, dated Jan. 29, 2016, for U.S. Appl. No. 14/163,849, 61 pages.
Frind et al., "System and Methods for Training and Employing a Machine Learning System in Evaluating Entity Pairs," U.S. Appl. No. 61/756,912, filed Jan. 25, 2013, 75 pages.
Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.
Kuchka et al., "Apparatus, Method and Article to Identify Discrepancies Between Clients and in Response Prompt Clients in a Networked Environment," Office Action, dated Apr. 4, 2016, for U.S. Appl. No. 14/204,939, 80 pages.
Levi et al., "Apparatus, Method and Article to Facilitate Automatic Detection and Removal of Fraudulent User Information in a Network Environment," U.S. Appl. No. 61/911,908, filed Dec. 4, 2013, 88 pages.
Levi et al., "Apparatus, Method and Article to Effect User Interest-Based Matching in a Network Environment," U.S. Appl. No. 61/976,296, filed Apr. 7, 2014, 111 pages.
MacKinnon, "Apparatus, Method and Article to Facilitate Exchange of Messages in a Network Environment," U.S. Appl. No. 61/918,466, filed Dec. 19, 2013, 83 pages.
Oldridge et al., "Apparatus, Method and Article to Effect Electronic Message Reply Rate Matching in a Network Environment," U.S. Appl. No. 61/914,154, filed Dec. 10, 2013, 50 pages.
Oldridge et al., "Apparatus, Method and Article to Facilitate User Behavioral Based Determination of User Values in a Network Environment," U.S. Appl. No. 14/737,121, filed Jun. 11, 2015, 68 pages.
Oldridge et al. "Systems and Methods for Training and Employing a Machine Learning System in Providing Service Level Upgrade Offers," U.S. Appl. No. 61/974,129, filed Apr. 2, 2014, 95 pages.
Artzi et al., "Predicting Responses to Microblog Posts," *NAACL HLT '12 Proceedings of the 2012 Conference of the North American Chapter of the Association for Computational Linguistics: Human Language Technologies*, Montreal, Canada , Jun. 3-8, 2012, pp. 602-606.
Avrahami et al., "Responsiveness in Instant Messaging: Predictive Models Supporting Inter-Personal Communication," *Proceedings of the SIGCHI Conference on Human Factors in Computing Systems*, Montréal, Québec, Canada, Apr. 22-27, 2006, pp. 731-740.
Kononenko, "Semi-Naïve Bayesian Classifier," *EWSL-91 Proceedings of the European working session on learning on Machine learning*, Porto, Portugal, 1991, pp. 206-219.
Notice of Allowance, dated Feb. 10, 2017, for U.S. Appl. No. 14/163,849, Frind et al., "Systems and Methods for Training and Employing a Machine Learning System in Evaluating Entity Pairs," 5 pages.
Notice of Allowance, dated Feb. 3, 2017, for U.S. Appl. No. 14/339,328, Frind et al., "Apparatus, Method and Article to Facilitate Matching of Clients in a Networked Environment," 14 pages.
Office Action, dated Feb. 3, 2017, for U.S. Appl. No. 14/561,004, Levi et al., "Apparatus, Method and Article to Facilitate Automatic Detection and Removal of Fraudulent User Information in a Network Environment," 23 pages.
Office Action, dated Jul. 5, 2017, for U.S. Appl. No. 14/563,504, Oldridge et al., "Apparatus, Method and Article to Effect Electronic Message Reply Rate Matching in a Network Environment," 20 pages.
Office Action, dated May 17, 2017, for U.S. Appl. No. 14/204,939, Kuchka et al., "Apparatus, Method and Article to Identify Discrepancies Between Clients and in Response Prompt Clients in a Networked Environment," 82 Pages.
Supplemental Notice of Allowability, dated Oct. 28, 2016, for U.S. Appl. No. 13/971,483, Frind et al., "Apparatus, Method and Article to Facilitate Matching of Clients in a Networked Environment," 9 pages.
Arbelaitz et al., "Web usage and content mining to extract knowledge for modelling the users of the Bidasoa Turismo website and to adapt it," *Expert Systems with Applications* 40(18):7478-7491, 2013.
Dokoohaki et al., "Mining Divergent Opinion Trust Networks through Latent Dirichlet Allocation," *International Conference on Advances in Social Networks Analysis and Mining*, IEEE/ACM, Istanbul, Turkey, pp. 879-886, 2012.
Geroimenko (Ed.) et al., *Visualizing the Semantic Web*, Springer, London, 2006, Chapter 14, pp. 229-241, Paolillo et al., "Social Network Analysis on the Semantic Web: Techniques and Challenges for Visualizing FOAF," 13 pages.
Khadangi et al., "Measuring Relationship Strength in Online Social Networks based on users' activities and profile information," *3rd International Conference on Computer and Knowledge Engineering*, Ferdowsi University of Mashhad, 2013, 5 pages.
Notice of Allowance, dated Aug. 2, 2017, for U.S. Appl. No. 14/668,808, Levi et al., "Apparatus, Method and Article to Effect User Interest-Based Matching in a Network Environment," 12 pages.
Parimi et al., "Predicting Friendship Links in Social Networks Using a Topic Modeling Approach," *Pacific-Asia Conference on Knowledge Discovery and Data Mining*, Advances in Knowledge Discovery and Data Mining, pp. 75-86, 2011.
Peled et al., "Entity Matching in Online Social Networks," *Proceedings of the 2013 International Conference on Social Computing*, pp. 339-344, 2013.
Zhao et al., "Relationship strength estimation for online social networks with the study on Facebook," *Neurocomputing* 95:89-97, 2012.
Office Action, dated Dec. 29, 2017, for U.S. Appl. No. 14/575,888, MacKinnon, "Apparatus, Method and Article to Facilitate Exchange of Messages in a Network Environment," 31 pages.
Office Action, dated Feb. 28, 2018, for U.S. Appl. No. 14/679,792, Oldridge et al., "Apparatus, Method and Article to Predict and Prevent Chargebacks in a Network Environment," 64 pages.
Office Action, dated Mar. 20, 2018, for U.S. Appl. No. 14/737,121, Oldridge et al., "Apparatus, Method and Article to Facilitate User Behavioral Based Determination of User Values in a Network Environment," 39 pages.
Office Action, dated Jul. 10, 2018, for U.S. Appl. No. 14/672,749, Oldridge et al., "Systems and Methods for Training and Employing a Machine Learning System in Providing Service Level Upgrade Offers," 66 Pages.

\* cited by examiner

APPARATUS, METHOD AND ARTICLE TO FACILITATE AUTOMATIC DETECTION AND REMOVAL OF FRAUDULENT ADVERTISING ACCOUNTS IN A NETWORK ENVIRONMENT

BACKGROUND

Technical Field

The present disclosure generally relates to computing systems and methods, and in particular to systems and methods that facilitate the detection of suspected fraudulent advertising accounts in computing systems and networks.

Description of the Related Art

Web-based advertising appearing on a Website provides a revenue stream that offsets the costs incurred by the Website developer and/or operator in creating, improving, and hosting the Website. Such revenue streams may take many forms dependent upon the requirements of the Website developer and/or operator and the needs of the advertiser. Many different advertising online advertising models exist. For example, a "cost per impression" model generates revenue for a Website developer and/or operator based on the number of visitors to the respective Website (e.g., $0.50 per 1,000 impressions or Website visitors). A "cost-per-click" or "click-through" model generates revenue for a Website developer and/or operator based on the number of visitors to the respective Website who actually visit the advertiser's Website by clicking on an advertisement appearing on the Website developer's Website (e.g., $0.50 per click-through).

To establish an online presence, Website developers or operators may require a potential advertiser to create an advertising account into which an initial sum is deposited. As Website users and/or visitors view or click-through the advertising, the Website developer or operator withdraws an amount from the advertiser's account based on the number of impressions, number of click-throughs, etc. In some instances, unscrupulous advertisers will establish an advertiser's account with a Website operator using stolen or otherwise illegally obtained payment information (e.g., stolen or illegally obtained credit card account information) using fraudulent account information to evade apprehension when the Website operator detects the fraudulent nature of the advertiser. In instances where illegally obtained financial information is used to establish advertiser accounts, financial institutions can and often do "chargeback" the full amount of the purchase against the Website operator. Such chargebacks represent a loss to the Website operator in both actual revenue as well as potential revenue that may be earned from legitimate advertisers. In extreme circumstances, such chargebacks may result in a financial institution halting the processing of financial transactions by the Website operator, effectively precluding the Website operator from receiving payment.

BRIEF SUMMARY

Website operators collect information from advertisers when an advertiser initially sets up an account to cover the cost of placing advertisements on one or more Websites controlled by the Website operator. Such information may be used by the Website operator to form an advertiser account profile. An account advertiser profile may include data on a number of property attributes and a number of behavioral attributes logically associated with the advertiser account. Such property and behavioral attributes may be directly collected from the advertiser and/or the systems used by the advertiser in establishing the advertiser account. Advertiser property attribute information may include, but is not limited to contact information, contact name, address, and payment information. Advertiser property attribute information collected from the advertiser's system may include but is not limited to, Internet protocol (IP) address, IP country, Internet service provider (ISP) identity, and tracking cookie, and similar.

As the advertiser transacts business with the Website operator, advertiser behavior attribute information may also be collected. Such advertiser behavior attribute information may include, but is not limited to, number of payment cards used to fund the account, frequency at which payment cards are added/removed, frequency at which payment cards funding the account are declined, time interval between deposits to the account, and similar.

Over time, the Website operator may develop a significant database containing advertiser account property and behavior attribute value information for a number of known valid advertiser accounts, a number of known fraudulent (or fraudulently generated) advertiser accounts, and a number of active advertiser accounts that may or may not be valid advertiser accounts. By statistically analyzing the property and behavioral attribute value information collected from a plurality of known valid advertiser accounts and from a plurality of known fraudulent advertiser accounts using a fraudulent advertiser account detection system, advertiser account attribute values and/or combinations of attribute values characterizing at least one of fraudulent advertiser accounts and/or valid advertiser accounts may be identified. For example, the fraudulent advertiser account detection system may evaluate a set of advertiser accounts representative of a current and/or historical population of advertiser accounts and which includes a plurality of known valid advertiser accounts and a plurality of known fraudulent advertiser accounts.

Using such a set of advertiser accounts, the fraudulent advertiser account detection system autonomously determines an initial probability that a particular active advertiser account is one of either a fraudulent advertiser account or a valid advertiser account. Additionally, using such a set of advertiser accounts, the fraudulent advertiser account detection system autonomously determines a value indicative of the likelihood that particular attribute values and/or combinations of attribute values are found in an advertiser account profile logically associated with at least one of a valid advertiser account or a fraudulent advertiser account.

Using the determined initial probabilities and the determined likelihoods, the fraudulent advertiser account detection system can autonomously determine a conditional probability value, score, or similar metric for each active advertiser account included in a plurality of active advertisers providing creatives or similar advertising media for incorporation into Web pages provided to Web users by the Website operator. The determined conditional probability value for each active advertiser is based at least in part on the attribute values and/or combinations of attribute values appearing in the advertiser account profile logically associated with the respective advertiser. The fraudulent advertiser account detection system compares each respective determined conditional probability value to a number of defined thresholds to assess or otherwise determine whether the advertiser account logically associated with the conditional probability value is one of either a fraudulent or suspected fraudulent advertiser (i.e., the attribute values or combinations of attribute values appearing in the associated active advertiser account profile are consistent with those found in known fraudulent advertiser account profiles) or a valid advertiser.

Advertisers identified by the fraudulent advertiser account detection system as fraudulent or suspected fraudulent advertisers may be subjected to additional autonomous and/or manual verification performed by the Website operator or a third party verification entity or may be removed from the list of active advertisers and not permitted to supply advertising on Webpages supplied to Web users by the Website operator until subsequent autonomous and/or manual verification that the advertiser account is not fraudulent.

The ability for a Website operator to autonomously identify suspected fraudulent or fraudulent advertiser accounts in near-real time and on an ongoing basis, and thus, advantageously permits the Website operator to refund any funding or similar deposit amount provided by the suspected fraudulent or fraudulent advertiser prior to processing the payment by a payment processor, credit card issuer, or bank, thereby minimizing or even eliminating payment processor chargebacks to the Website operator attributable to such fraudulent advertiser accounts. Further, by determining values representative or indicative of initial probabilities and likelihoods for some or all active advertiser accounts on an ongoing basis, the Website operator is able to advantageously maintain an up-to-date set of attribute values and/or combinations of attribute values indicative of at least one of either fraudulent advertiser accounts and/or valid advertiser accounts.

A method of operation in at least a portion of a system to detect at least one of fraudulent advertiser accounts or related advertiser account profiles suspected of being fraudulently generated, the system which includes at least one processor and at least one nontransitory processor-readable medium that stores at least one of processor-executable instructions or processor-executable data, the at least one nontransitory processor-readable medium communicatively coupled to the at least one processor, may be summarized as including: generating, by the at least one processor, a set of advertiser accounts including at least a plurality of known fraudulent advertiser accounts and a plurality of known valid advertiser accounts; wherein each of the plurality of known fraudulent advertiser accounts and each of the plurality of known valid advertiser accounts has logically associated therewith a respective advertiser account profile that includes a number of advertiser account attributes; and wherein each of the number of advertiser account attributes has logically associated therewith at least one of a respective defined number of attribute values; from time-to-time determining by the at least one processor: a value indicative of an initial probability of an advertiser account included in the set of advertiser accounts being at least one of a fraudulent advertiser account $[p(y=S)]$ or a valid advertiser account $[p(y=V)]$ based at least in part on: a number of known fraudulent advertiser accounts included in the set, a number of known valid advertiser accounts included in the set, and the total number of advertiser accounts included in the set; for the attribute values or a combination of attribute values associated with at least some of the advertiser account profiles included in the set of advertiser accounts, a respective value indicative of a likelihood of the attribute values or the combination of attribute values being associated with at least one of a fraudulent advertiser account $[p(x_j^{(i)}|y=S)]$ or a valid advertiser account $[p(x_j^{(i)}|y=V)]$; and for each advertiser account in a plurality of active advertiser accounts, a conditional probability value $[p(y=S|x(i))]$ indicative of a probability that the respective advertiser account is fraudulent based on attribute values or combinations of attribute values included in the respective advertiser account profile and determined using the respective determined initial probabilities and determined likelihoods; designating, by the at least one processor, each active advertiser account with a respective determined conditional probability value at or above a defined first threshold value for removal from the plurality of active advertiser accounts; designating, by the at least one processor, each active advertiser account with a respective determined conditional probability value at or below a defined second threshold value for retention in the plurality of active advertiser accounts; and designating, by the at least one processor, each active advertiser account with a respective determined conditional probability value falling between the defined first threshold value and the defined second threshold value for additional review.

The method may further include: from time-to-time, autonomously updating, by the at least one processor, the plurality of known fraudulent advertiser accounts included in the set of advertiser accounts to include at least some of the active advertiser accounts designated for removal from the plurality of active advertiser accounts by the at least one processor. The method may further include: from time-to-time, autonomously updating, by the at least one processor, the plurality of known valid advertiser accounts included in the set of advertiser accounts to include at least some of the active advertiser accounts designated for retention in the plurality of active advertiser accounts by the at least one processor. The method may further include: from time-to-time, autonomously statistically analyzing, by the at least one processor, the distribution of conditional probability values falling between the defined first threshold and the defined second threshold to determine if a range of conditional probability values exists in which the advertiser accounts are more-likely-than not fraudulent. The method may further include: from time-to-time, autonomously updating, by the at least one processor, the first defined threshold value to include at least a portion of the range of conditional probability values in which the advertiser accounts are more-likely-than not fraudulent. Generating, by the at least one processor, the set of advertiser accounts including at least the plurality of known fraudulent advertiser accounts and the plurality of known valid advertiser accounts may include: autonomously selecting, by the at least one processor, advertiser accounts for inclusion in the plurality of active advertiser accounts. Autonomously selecting, by the at least one processor, advertiser accounts for inclusion in the plurality of active advertiser accounts may include: autonomously excluding from the set of advertiser accounts, by the at least one processor, at least some advertiser accounts created during a defined vetting period immediately preceding the determination of the conditional probability values. Autonomously selecting, by the at least one processor, advertiser accounts for inclusion in the plurality of active advertiser accounts further may include: autonomously including in the plurality of active advertiser accounts, by the at least one processor, a number of active advertiser accounts created during a defined vetting period immediately preceding the determination of the conditional probability values. Generating, by the at least one processor, the set of advertiser accounts having logically associated therewith a respective advertiser account profile that includes a number of advertiser account attributes, may include generating the set of account profiles that include one or more of the following advertiser account property-related attributes: a corporate identity of the advertiser account; a responsible party identity of the advertiser account; an internet protocol (IP) creation address for the advertiser account; an email domain of the advertiser account; an cookie associated with the advertiser account; an IP address country of the advertiser account; an IP address state of the advertiser account; a time zone offset of the advertiser account; a session IP address of the advertiser account; a time zone offset with the IP address country of the advertiser account; a shared corporate entity name of the advertiser account; an identity verification indicator of the advertiser account; a payment method of the advertiser account; and a payment detail of the advertiser account. Generating, by the at least one processor, the set of advertiser accounts having logically associated therewith a respective advertiser account profile that includes a number of advertiser account attributes, may include generating the set of account profiles that include one or more of the following advertiser account behavior-related attributes: a number of payment cards used to fund the advertiser account; a deposit amount used to fund the advertiser account; a number of payment cards used to fund the advertiser account and added over a defined time period; a number of payment cards used in an attempt to fund the advertiser account and failing authorization over a defined time period; a number of deposits used to fund the advertiser account over a defined time period; an error code returned by a payment processor on a payment card used to fund the advertiser account; an elapsed time interval between deposits used to fund the advertiser account; a similarity between a payment cardholder first name and an advertiser's first name; a similarity between a payment cardholder last name and an advertiser's last name; a number of parties using a payment card having a common name, address, card number, and expiration date; a total number of deposits into the advertiser account; an increase in advertiser account balance; and an elapsed time between advertiser account creation and a first deposit into the respective advertiser account. Computing a value indicative of an initial probability of each of the advertiser accounts included in the set of "m" advertiser accounts being at least one of a fraudulent advertiser account or a valid advertiser account may include: computing both a value indicative of the initial probability of each respective advertiser account being fraudulent $[p(x_j^{(i)}|y=S)]$ and a value indicative of the initial probability of each respective advertiser account being valid $[p(x_j^{(i)}|y=V)]$. Determining a respective value indicative of a likelihood of the attribute or the combination of attributes "p" being associated with at least one of a fraudulent advertiser account may include computing the value $[p(x_j^{(i)}|y=S)]$ according to:

$$p(x_j^{(i)} | y = S) = \frac{\sum_{i=1}^{m}\sum_{k=1}^{p} 1\{x_{j,k}^{(i)}, y = S\} + 1}{\sum_{i=1}^{m} 1\{y^{(i)} = S\}p + |d_j|}.$$

Determining a respective value indicative of a likelihood of the attribute or the combination of attributes being associated with at least one of a fraudulent advertiser account may include computing the value $[p(x_j^{(i)}|y=V)]$ according to:

$$p(x_j^{(i)} | y = V) = \frac{\sum_{i=1}^{m}\sum_{k=1}^{p} 1\{x_{j,k}^{(i)}, y = V\} + 1}{\sum_{i=1}^{m} 1\{y^{(i)} = V\}p + |d_j|}.$$

Determining a respective value indicative of the conditional probability value indicative of the probability that the respective advertiser account is fraudulent may include computing the value $$\left[p\left(y = \frac{S}{x^{(i)}}\right)\right]$$

according to:

$$p(y = S | x^{(i)}) = \frac{p(y = S)\prod_{j=1}^{n} p(x_j^{(i)} | y = S)}{p(y = S)\prod_{j=1}^{n} p(x_j^{(i)} | y = S) + p(y = V)\prod_{j=1}^{n} p(x_j^{(i)} | y = V)}.$$

Generating, by the at least one processor, the set of advertiser accounts including at least a plurality of known fraudulent advertiser accounts and a plurality of known valid advertiser accounts may include: generating the set of advertiser accounts including at least the plurality of known fraudulent advertiser accounts and the plurality of known valid advertiser accounts, wherein the plurality of known valid advertiser accounts is not mutually exclusive with the plurality of active advertiser accounts. Generating, by the at least one processor, the set of advertiser accounts including at least a plurality of known fraudulent advertiser accounts and a plurality of known valid advertiser accounts may include: generating the set of advertiser accounts including at least the plurality of known fraudulent advertiser accounts and the plurality of known valid advertiser accounts, wherein the plurality of known fraudulent advertiser accounts is mutually exclusive with the plurality of active advertiser accounts.

A fraudulent advertiser account detection system to detect at least one of fraudulent advertiser accounts or related advertiser account profiles suspected of being fraudulently generated, may be summarized as including: at least one processor; and at least one nontransitory processor-readable medium that stores at least one of processor-executable instructions or processor-executable data permitting the at least one processor to provide a fraudulent advertiser account detection system, the at least one nontransitory processor-readable medium communicatively coupled to the at least one processor, wherein the at least one processor: generates a set of advertiser accounts that includes at least a plurality of known fraudulent advertiser accounts and a plurality of known valid advertiser accounts; wherein each of the plurality of known fraudulent advertiser accounts and each of the plurality of known valid advertiser accounts has logically associated therewith a respective advertiser account profile that includes a number of advertiser account attributes; and wherein each of the number of attributes has logically associated therewith at least one of a respective defined number of attribute values; from time-to-time, determines: a value indicative of an initial probability of an advertiser account included in the set of advertiser account profiles being at least one of a fraudulent advertiser account profile [p(y=S)] or a valid advertiser account profile [p(y=V)] based at least in part on: a number of fraudulent advertiser accounts included in the set, a number of known valid advertiser accounts included in the set, and the total number of advertiser accounts included in the set; for at least some attribute values or combinations of attribute values associated with the profiles in the at set of advertiser accounts, a respective value indicative of a likelihood of the respective attribute values or the combinations of attribute values being associated with at least one of a fraudulent advertiser account [p($x_j^{(i)}$|y=S)] or a valid advertiser account [p($x_j^{(i)}$|y=V)]; and for each advertiser account included in a plurality of active advertiser accounts, a conditional probability value [p(y=S|$x^{(j)}$] indicative of a probability that the respective active advertiser account is fraudulent based on attribute values or combinations of attribute values included in the respective active advertiser account profile and determined using the respective determined initial probabilities and determined likelihoods; designates those active advertiser accounts having a determined conditional probability value greater than or equal to a defined first threshold value for removal from the plurality of active advertiser accounts; designates those active advertiser accounts having a determined conditional probability value less than or equal to a defined second threshold value for retention in the plurality of active advertiser accounts; and designates those active advertiser accounts having a determined conditional probability value falling between the defined first threshold value and the defined second threshold value for additional review.

The at least one processor further: from time-to-time, may autonomously update the plurality of known fraudulent advertiser accounts included in the set of advertiser accounts to include at least some of the active advertiser accounts designated for removal from the plurality of active advertiser accounts. The at least one processor may further: from time-to-time, autonomously update the plurality of known valid advertiser accounts included in the set of advertiser accounts to include at least some of the active advertiser accounts designated for retention in the plurality of active advertiser accounts. The at least one processor may further: from time-to-time, autonomously statistically analyze the distribution of conditional probability values falling between the defined first threshold and the defined second threshold to determine if a range of conditional probability values exists in which the advertiser accounts are more-likely-than not fraudulent. The at least one processor may further: from time-to-time, autonomously update the first defined threshold value to include at least a portion of the range of conditional probability values in which the advertiser accounts are more-likely-than not fraudulent. The at least one processor may further: autonomously select advertiser accounts for inclusion in the set of advertiser accounts. The at least one processor may further: autonomously exclude from the set of advertiser accounts at least some advertiser accounts created during a defined vetting period immediately preceding the determination of the conditional probability values by the at least one processor. The at least one processor may further: autonomously include in the plurality of active advertiser accounts at least some advertiser accounts created during the defined vetting period immediately preceding the determination by the at least one processor of the conditional probability values. The number of advertiser account profile attributes may comprise a number of advertiser account properties, including at least one of: a corporate identity of the advertiser account; a responsible party identity of the advertiser account; an internet protocol (IP) creation address for the advertiser account; an email domain of the advertiser account; an cookie associated with the advertiser account; an IP address country of the advertiser account; an IP address state of the advertiser account; a time zone offset of the advertiser account; a session IP address of the advertiser account; a time zone offset with the IP address country of the advertiser account; a shared corporate entity name of the advertiser account; an identity verification indicator of the advertiser account; a payment method of the advertiser account; and a payment detail of the advertiser account. The number of advertiser account profile attributes may comprise a number of advertiser account behaviors including at least one of: a number of payment cards used to fund the advertiser account; a deposit amount used to fund the advertiser account; a number of payment cards used to fund the advertiser account and added over a defined time period; a number of payment cards used in an attempt to fund the advertiser account and failing authorization over a defined time period; a number of deposits used to fund the advertiser account over a defined time period; an error code returned by a payment processor on a payment card used to fund the advertiser account; an elapsed time interval between deposits used to fund the advertiser account; a similarity between a payment cardholder first name and an advertiser's first name; a similarity between a payment cardholder last name and an advertiser's last name; a number of parties using a payment card having a common name, address, card number, and expiration date; a total number of deposits into the advertiser account; an increase in advertiser account balance; and an elapsed time between advertiser account creation and a first deposit into the respective advertiser account. The at least one processor may further: for each of the advertiser accounts included in the set of "m" advertiser accounts, compute both a value indicative of the initial probability of each respective advertiser account being fraudulent [p($x_j^{(i)}$|y=S)] and a value indicative of the initial probability of each respective advertiser account being valid [p($x_j^{(i)}$|y=V)]. The at least one processor further: computes the value [p($x_j^{(i)}$|y=S)] according to:

$$p(x_j^{(i)} \mid y=S) = \frac{\sum_{i=1}^{m}\sum_{k=1}^{p} 1\{x_{j,k}^{(i)}, y=S\}+1}{\sum_{i=1}^{m} 1\{y^{(i)}=S\}p + |d_j|}.$$

The at least one processor may further: compute the value [p($x_j^{(i)}$|y=V)] according to:

$$p(x_j^{(i)} \mid y=V) = \frac{\sum_{i=1}^{m}\sum_{k=1}^{p} 1\{x_{j,k}^{(i)}, y=V\}+1}{\sum_{i=1}^{m} 1\{y^{(i)}=V\}p + |d_j|}.$$

The at least one processor may further: compute the value $$\left[p\left(y = \frac{S}{x^{(i)}}\right)\right]$$

according to:

$$p(y=S\mid x^{(i)}) = \frac{p(y=S)\prod_{j=1}^{n} p(x_j^{(i)}\mid y=S)}{p(y=S)\prod_{j=1}^{n} p(x_j^{(i)}\mid y=S) + p(y=V)\prod_{j=1}^{n} p(x_j^{(i)}\mid y=V)}.$$

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

Figure 1A:
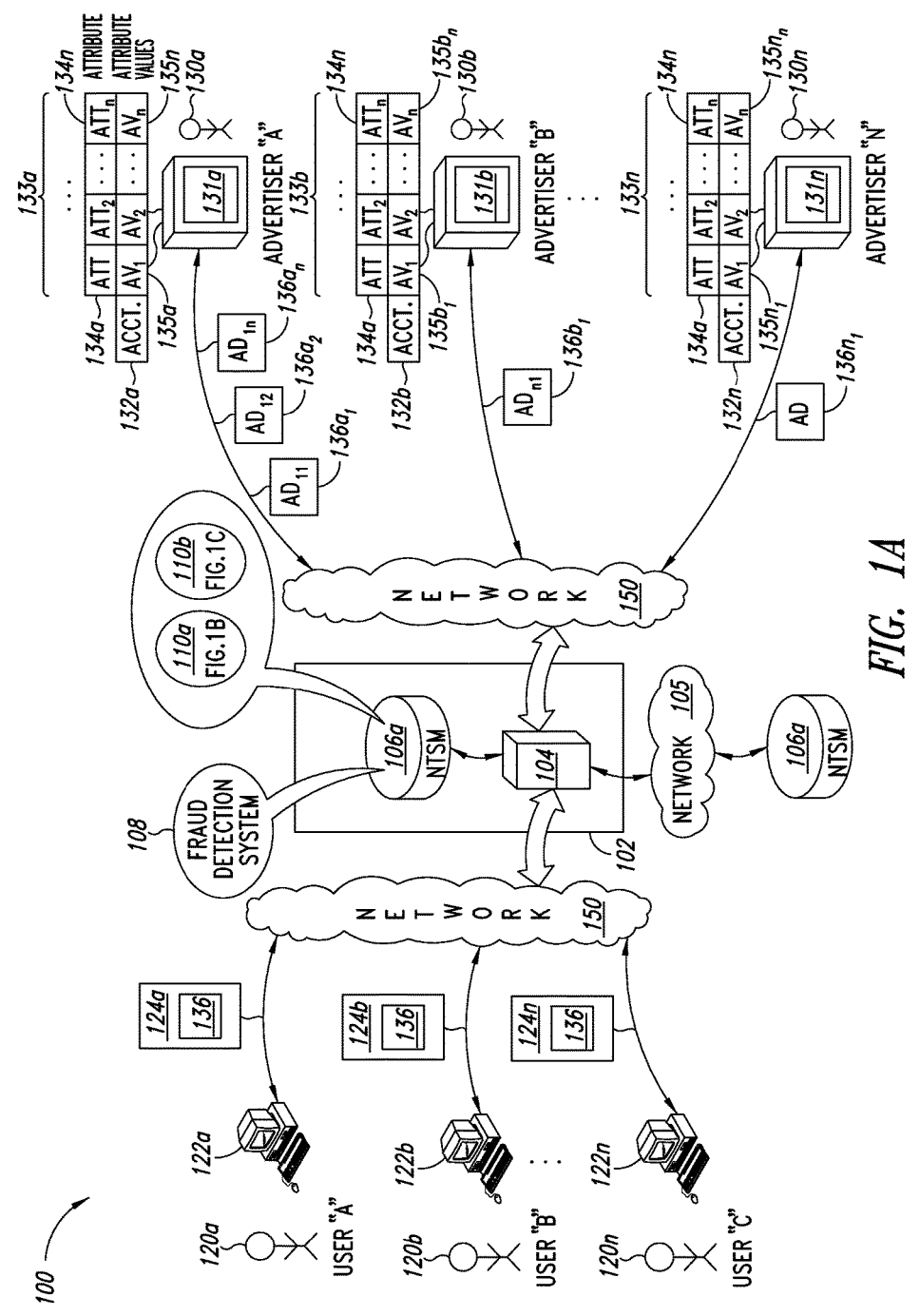

FIG. 1A is a schematic view of a fraudulent advertiser account detection environment according to one illustrated embodiment, including a fraudulent advertiser account detection system; a number of user client entities; and a number of valid and fraudulent advertisers seeking to place advertising on a Website visited by the number of end-user client entities, according to one illustrated embodiment.

DETAILED DESCRIPTION

Figure 1B:
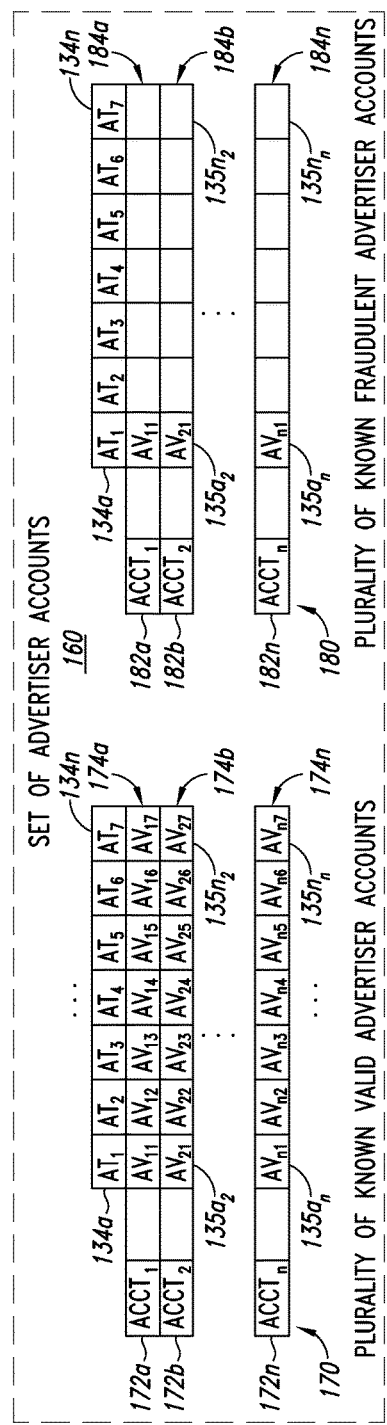
FIGS. 1B and 1C are block diagrams of illustrative databases created, administered and maintained on one or more nontransitory storage media by the fraudulent advertiser account detection system depicted in FIG. 1A, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments. In other instances, well-known mathematical and statistical methods for performing statistical analyses and other well-known mathematical operation have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

FIG. 1A shows a networked environment 100 in which a Website operator 102 maintains one or more Websites on one or more processor-based devices 104, such as one or more network connected servers. To defray capital and operating expenses associated with providing Webpages 124a-124n (collectively, "Webpages 124") to Website users 120a-120n (collectively, "Website users 120" or "users 120"), the Website operator 102 may place revenue generating advertising content 136 provided by any number of advertisers 130a-130n (collectively, "advertisers 130") on the Web pages 124 delivered to users 120 via network connected processor-based devices 122a-122n. Such Webpages 124 are typically delivered via a network 150 such as the Worldwide Web or Internet. In at least some implementations, the Website operator 102 may implement one or more specialized fraudulent advertiser account detection systems 108 as hardware, software executed by a processor, or any combination thereof. The one or more fraudulent advertiser account detection systems 108 autonomously determine a conditional probability value indicative of an advertiser account 132a-132n being at least one of either a valid advertiser account funded using an authorized or valid payment method (e.g., a valid, authorized, and/or approved payment card such as a credit card or debit card) or a fraudulent advertiser account funded using an unauthorized or invalid payment method (e.g., an invalid, unauthorized, and/or disapproved payment card such as a credit card or debit card).

Each active advertiser 130 provides "creatives" (i.e., advertising content 136 such as still images, audio, video, or combinations thereof) to the Website operator 102 for placement on or in the Webpages 124 delivered to Website users 120. Such an arrangement beneficially provides exposure to the advertiser 130 and, in return, an income stream in the form of paid placement, paid delivered impressions, and/or paid user click-throughs to the Website operator 102. Website operators 102 often require advertisers 1390 to establish an advertiser account 132 that is initially funded by a deposit placed into the account by the advertiser 130 using an electronic payment card. As advertisements 136 are delivered to Web users 120, the Website operator 102 draws or drafts payment from the advertiser account 132 according to the terms of an advertising agreement between the Website operator 102 and the respective advertiser 130. Where an advertiser 130 provides such payment or deposits using one or more authorized payment methods (e.g., authorized use of a payment card such as a credit or debit card), the Website operator 102 receives payment and the advertiser is considered a "valid advertiser."

However, instances arise where less scrupulous advertisers may create an advertiser account 132 and provide a payment or deposit using one or more unauthorized payment methods (e.g., unauthorized or fraudulent use of a payment card such as a credit or debit card). In such instances, the Website operator 102 delivers advertising content 136 provided by advertiser 130 to users 120 and unknowingly draws or drafts payment against the unauthorized payment method used by the advertiser 130 to fund the respective advertiser account 132. However, upon detecting the unauthorized payment method used to fund the advertiser account 132, the payment processor issues a chargeback against the Website operator 102 for the amount initially deposited into the advertiser account 132. In such instances, the Website operator 102 realizes both a direct loss from the fraudulent advertising content as well as an indirect loss attributable to the lost revenue from placement of valid advertising content into the Webpages 124 that carried the fraudulently placed advertising content. In some instances, where such payment processor chargebacks exceed defined thresholds, the Website operator 102 may incur additional payment processing costs (e.g., a higher per transaction costs) or the payment processor may halt payment processing services for the Website operator. In those instances where an advertiser 130 provides such payment or deposits using unauthorized payment methods, the advertiser 130 is considered a "fraudulent advertiser."

The one or more processor-based devices 104 are communicably coupled to one or more nontransitory storage media 106a-106b. At least a portion of the nontransitory storage media 106a may be local to the one or more processor-based devices 104. At least a portion of the nontransitory storage media 106b may be communicably coupled to the one or more processor-based devices 104 via one or more networks 105. The nontransitory storage media 106 stores a number of databases, data stores, or similar nontransitory data storage structures (collectively, "databases 110," only two 110a and 110b shown for clarity) and the processor-executable instructions, logic or programming 118 that permit the one or more processor-based devices 104 to function as a fraudulent advertiser account detection system 108. The one or more nontransitory storage media 106 may store or otherwise retain data indicative of a set of advertising accounts 110a that includes a plurality of known valid advertiser accounts and a plurality of known fraudulent advertiser accounts. Additionally, the one or more nontransitory storage media 106 may store or otherwise retain data indicative of a plurality of active advertising accounts 110b.

Each advertiser 130a-130n creates a respective advertiser account 132a-132n having a logically associated advertiser account profile 133a-133n (collectively, "advertiser account profile 133"). Each advertiser account profile 133 includes a number of attributes 134a-134n (collectively "attributes 134") each of which has logically associated therewith one or more respective attribute values 135a-135n (collectively "attribute values 135") that characterize various properties and/or behavioral aspects of the respective advertiser 130a-130n.

Attribute values 135 populating the advertiser account profile 133 may be collected via self-reporting by each respective advertiser 130a-130n; autonomously, semi-autonomously, or manually collected based on advertiser behavior; and/or autonomously, semi-autonomously, or manually collected from data stored on the processor-based device 131a-131n used by the respective advertiser 130a-130n to communicate with the one or more processor-based devices 104.

Illustrative, non-exhaustive, examples of self-reported attribute values include, but are not limited to: the name of the advertising entity; a first and last name of a responsible party at the advertising entity; spelling and capitalization in the name of the advertising entity and/or responsible party; the state and telephone number for the advertising entity and/or responsible party; the payment card information for the advertising entity and/or responsible party; the number of different payment cards used by the advertising entity and/or responsible party; the size, frequency, and type of deposits made to the advertiser account; the advertiser's time zone and/or time zone offset within the advertiser's country; whether the advertiser has submitted a creative (e.g., advertisement mock-up) prior to making a deposit into the advertiser account; and the URL for the advertiser's creative.

Illustrative, non-exhaustive, examples of autonomously collected advertiser property and behavioral attributes include, but are not limited to: the internet protocol (IP) address of the device used by the advertiser to communicate with the one or more processor-based devices 104; the email domain of the advertiser; an cookie associated with the advertiser's processor-based device 131; the country and/or state associated with the advertiser's IP address; whether the advertiser's company name is used by other companies; whether the advertiser's IP address is the same as other corporate IP addresses; whether the cookie associated with the advertiser's account and User ID are the same; whether the advertiser's telephone and state are in agreement; error codes returned from payment processors; number of other advertisers sharing same payment card information, address, expiration date; total deposits made into the advertiser's account; size of increase in advertiser's account balance; and the elapsed time between creation of the advertiser account and the advertiser's first deposit.

The fraudulent advertiser account detection system 108 provides the Website operator 102 the ability to autonomously, semi-autonomously, or manually learn, discern, detect, or otherwise determine those attribute values 135 and/or combinations of attribute values 135 most typically associated with fraudulently created advertiser accounts 132 and/or advertiser accounts 132 funded with a fraudulent or otherwise improperly obtained payment method (e.g., fraudulently obtained or stolen payment cards such as debit or credit cards).

To train or otherwise "teach" the fraudulent advertiser account detection system 108 those attribute values and/or combinations of attribute values 135 associated with either one of a fraudulent advertiser account or a valid advertiser account, a set of advertiser accounts 160 that includes a plurality of known valid advertiser accounts 170 and a plurality of known fraudulent advertiser accounts 180 is used to train the fraudulent advertiser account detection system 108. The set of advertiser accounts 160 may include some or all of the active advertiser accounts 132 included in a plurality of active advertiser accounts 190. In at least some instances, the set of advertiser accounts 160 is autonomously populated by the fraudulent advertiser account detection system 108 to include a population of known valid advertiser accounts 172 and a population of known fraudulent advertiser accounts 182 representative of the historical population of the plurality of active advertiser accounts 190.

In at least some instances, the known valid advertiser accounts 172 included in the plurality of known valid advertiser accounts 170 may be limited to a defined temporal range, such as advertiser accounts 130 created within the last year, last two years, or last three years. The use of such a temporal range advantageously permits a more responsive detection of account attribute values 135 and/or combinations of attribute values 135 associated with valid advertiser accounts while minimizing bias caused by account attribute values 135 and/or combinations of attribute values 135 associated with older, potentially outdated known valid advertiser accounts 172.

In at least some instances, the known fraudulent advertiser accounts 182 included in the plurality of known fraudulent advertiser accounts 180 may be limited to a defined temporal range, such as advertiser accounts 130 created within the last year, last two years, or last three years. The use of such a temporal advantageously permits a more responsive detection of account attribute values 135 and/or combinations of attribute values 135 associated with fraudulent advertiser accounts while minimizing bias caused by account attribute values 135 and/or combinations of attribute values 135 associated with older, potentially outdated known fraudulent advertiser accounts 182.

The fraudulent advertiser account detection system 108, from time-to-time at periodic or aperiodic intervals, autonomously or semi-autonomously determines a value indicative of an initial probability that an active advertiser account 132 is one of either a valid advertiser account or a fraudulent advertiser account. The fraudulent advertiser account detection system 108 also uses the set of advertiser accounts 160 to, from time-to-time at periodic or aperiodic intervals, autonomously or semi-autonomously determines a value indicative of a likelihood that the presence of one or more attribute values 135 and/or one or more combinations of attribute values 135 appearing in an active advertiser account profile 133 are indicative of at least one of either a valid advertiser account or a fraudulent advertiser account.

The fraudulent advertiser account detection system 108 uses the aforementioned determined initial probabilities and likelihoods to determine a conditional probability value indicative of the probability that an active advertiser account 132 included in the plurality of active advertiser accounts 190 is one of either a valid advertiser account or a fraudulent advertiser account. For advertiser accounts 132 logically associated with an advertiser account profile 133 that includes attribute values 135 and/or combinations of attribute values 135 yielding a determined conditional probability value at or above a first defined threshold value, the fraudulent advertiser account detection system 108 can flag the respective active advertiser account 132 as a fraudulent or suspected fraudulent advertiser account. In some implementations, creatives 136 provided by advertisers 130 logically associated with those active advertiser accounts 132 flagged by the fraudulent advertiser account detection system 108 as a fraudulent or suspected fraudulent advertiser account are not included on Webpages 124 provided to users 120 by the Website operator 102. In some implementations, payments by advertisers 130 logically associated with those active advertiser accounts 132 flagged by the fraudulent advertiser account detection system 108 as a fraudulent or suspected fraudulent advertiser account are reversed or otherwise suspended to minimize or even eliminate the possibility of a chargeback by the Website operator's payment processor. Furthermore, active advertiser accounts 132 flagged as a fraudulent or suspected fraudulent advertiser account by the fraudulent advertiser account detection system 108 may be subjected to additional automated and/or manual review prior to a dispositive determination that the respective fraudulent or suspected fraudulent advertiser account is a known fraudulent advertiser account 182.

In some instances, the fraudulent advertiser account detection system 108 may autonomously designate active advertiser accounts 132 flagged as a fraudulent or suspected fraudulent advertiser account as a known fraudulent advertiser account 182. Such an autonomous designation by the fraudulent advertiser account detection system 108 as a known fraudulent advertiser account 182 may be based at least in part on the determined conditional probability value logically associated with the respective active advertiser account. For example, active advertiser accounts 132 logically associated with a conditional probability value exceeding the first defined threshold by more than a defined amount may be autonomously designated a known fraudulent advertiser account 182 by the fraudulent advertiser account detection system 108, while those active advertiser accounts 132 logically associated with a determined conditional probability value at or above the first defined threshold but not exceeding the first defined threshold by more than the defined amount may be flagged as a fraudulent or suspected fraudulent advertiser account requiring further review prior to designation as a known fraudulent advertiser account 182. In other instances, the fraudulent advertiser account detection system 108 may autonomously designate any active advertiser account 132 logically associated with a conditional probability value at or above the first defined threshold value as a known fraudulent advertiser account 182. The fraudulent advertiser account detection system 108 may, from time-to-time include at least some of the known fraudulent advertiser accounts 182 in the plurality of known fraudulent advertiser accounts 180.

For active advertiser accounts 132 logically associated with an advertiser account profile 133 that includes attribute values 135 and/or combinations of attribute values 135 yielding a determined conditional probability value at or below a second defined threshold value, the fraudulent advertiser account detection system 108 can flag the respective advertiser account 132 as a valid or suspected valid advertiser account. In some instances, the fraudulent advertiser account detection system 108 may autonomously designate active advertiser accounts 132 flagged as a valid or suspected valid advertiser account as a known valid advertiser account 172. Such an autonomous designation by the fraudulent advertiser account detection system 108 as a known valid advertiser account 172 may be based at least in part on the determined conditional probability value logically associated with the respective active advertiser account. For example, active advertiser accounts 132 logically associated with a conditional probability value less than the second defined threshold by more than a defined amount may be autonomously designated a known valid advertiser account 172 by the fraudulent advertiser account detection system 108, while those active advertiser accounts 132 logically associated with a conditional probability value at or below the second defined threshold but not less than the second defined threshold by more than the defined amount may be flagged as a valid or suspected valid advertiser account requiring further review prior to designation as a known valid advertiser account 172. In other instances, the fraudulent advertiser account detection system 108 may autonomously designate any active advertiser account 132 logically associated with a conditional probability value at or below the second defined threshold value as a known valid advertiser account 172. The fraudulent advertiser account detection system 108 may, from time-to-time include at least some of the known valid advertiser accounts 172 in the plurality of known valid advertiser accounts 170.

For advertiser accounts 132 logically associated with an advertiser account profile 133 that includes attribute values 135 and/or combinations of attribute values 135 yielding a determined conditional probability value falling between the first defined threshold value and the second defined threshold value, the fraudulent advertiser account detection system 108 can flag the respective advertiser account 132 for further review or follow-up to determine whether the respective advertiser account 132 is a known valid advertiser account 172 or a known fraudulent advertiser account 182. In some instances, the further review may be performed manually, for example by a customer service representative of the Website operator 102 contacting the respective advertiser 130 to confirm the validity of an advertiser. In some instances, the further review may be partially or completely automated via the fraudulent advertiser account detection system 108, for example by auto generating and communicating emails to the advertiser 130 or by confirming the validity of the advertiser 130 using one or more third party confirmation Websites (e.g., local, regional, or national Better Business Bureau rankings; Dunn & Bradstreet rankings; state Attorneys General records; and the like).

Importantly, once an active advertiser account 133 included in the plurality of active advertiser accounts 190 is determined to be a known valid advertiser account 172, the fraudulent advertiser account detection system 108 will, from time-to-time, determine a new conditional probability value for the respective active advertiser account 132 to determine whether the attribute values and/or combinations of attribute values 135 in the advertiser account profile 133 logically associated with the respective active advertiser account 132 yield a conditional probability value indicative of a known valid advertiser account 172. In some implementations, such "confirming" conditional probability values may be compared by the fraudulent advertiser account detection system 108 to the second defined threshold value. In other implementations, such "confirming" conditional probability values may be compared by the fraudulent advertiser account detection system 108 to a new (i.e., a third) defined threshold value which may be greater than or less than the second defined threshold value. By determining such a "confirming" conditional probability value for some or all of the known valid advertiser accounts 182 from time-to-time, the fraudulent advertiser account detection system 108 maintains a high level of confidence that the active advertiser accounts 132 designated known valid advertiser account 182 by the fraudulent advertiser account detection system 108 and included in the plurality of known valid advertiser accounts 170 represent actual, valid, advertiser accounts. Such also provides the fraudulent advertiser account detection system 108 with the capability to review the attribute values 135 and/or combinations of attribute values 135 appearing in advertiser account profiles 133 logically associated with previously identified known valid advertiser accounts 172 based on newly evolving patterns or attribute values 135 or combinations of attribute values 135 appearing in at least one of known valid advertiser accounts 172 and/or known fraudulent advertiser accounts 182.

Referring now to FIG. 1B, one or more databases 110a may store, maintain, or otherwise retain data indicative of one or more sets of advertiser accounts 160 that include a plurality of known valid advertiser accounts 170 and a plurality of known fraudulent advertiser accounts 180. Each of the known valid advertiser accounts 172a-172n included in the plurality of known valid advertiser accounts 170 is logically associated with an advertiser 130 and has logically associated therewith a respective advertiser account profile 174a-174n. Each of the known fraudulent advertiser accounts 182 included in the plurality of known fraudulent advertiser accounts 180 is logically associated with an advertiser 130 and has logically associated therewith a respective advertiser account profile 184a-184n.

Figure 1C:
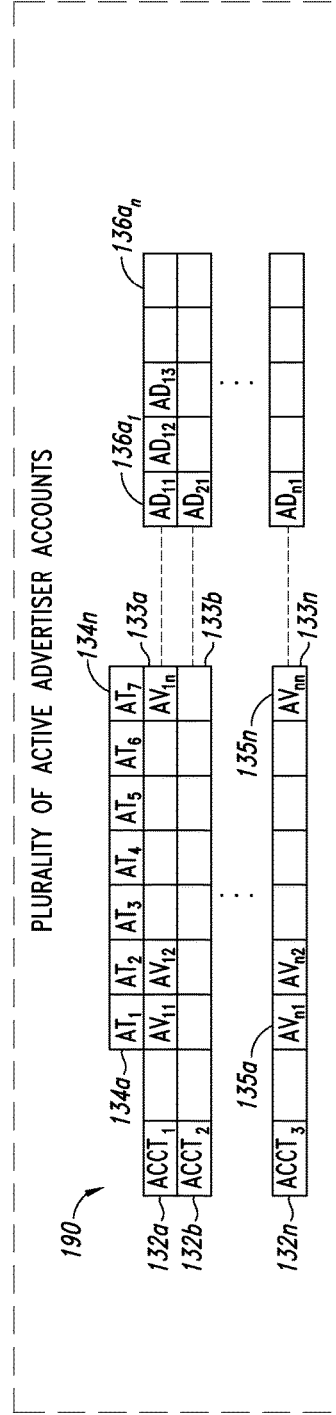

Referring now to FIG. 1C, one or more databases 110b may store, maintain, or otherwise retain data indicative of the plurality of active advertiser accounts 190. The plurality of active advertiser accounts 190 may include any number of advertiser accounts 132. The advertiser accounts 132 may include any number of known valid advertiser accounts 172, and any number of advertiser accounts that have not yet been flagged by the fraudulent advertiser account detection system 108 as either a known valid advertiser account 172 or a known fraudulent advertiser account 182.

The nontransitory storage media 106 may store, maintain or otherwise retain data indicative of one or more sets of machine- or processor-executable instructions, logic sets, and/or programs. In at least some implementations, when the one or more sets of machine- or processor-executable instructions, logic sets, and/or programs are executed by the at least one processor 104, a specialized fraudulent advertiser account detection system 108 is provided as an integral or stand-alone system, module, and/or subsystem.

Figure 2:
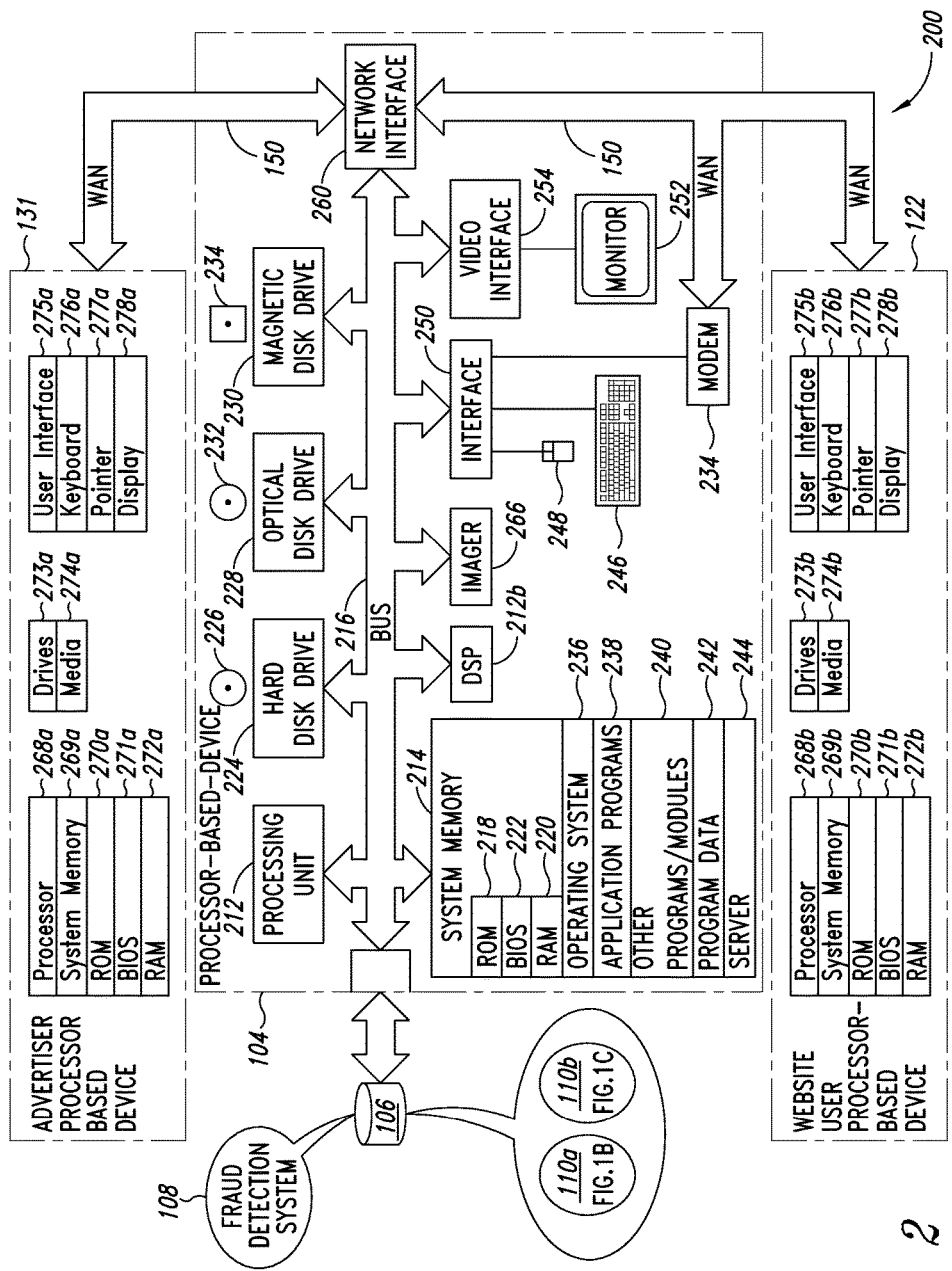
FIG. 2 is a functional block diagram of a fraudulent advertiser account detection system networked to a valid advertiser computer system and a fraudulent advertiser computer system, according to one illustrated embodiment.

FIG. 2 and the following discussion provide a brief, general description of a suitable network environment 200 in which the various illustrated fraudulent advertiser account detection systems 108 may be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked environment 200 comprising one or more processor-based devices 104 (e.g., one or more Webservers) on which a fraudulent advertiser account detection system 108 is implemented. The one or more processor-based devices 104 are communicably coupled to one or more nontransitory machine-readable storage media 106 (only one illustrated). The one or more processor-based devices 104 is directly or indirectly communicably coupled to the nontransitory computer- or processor-readable storage media 106 via one or more communications channels, for example one or more busses, parallel cables, serial cables, or wireless network channels capable of high speed communications, for instance via Universal Serial Bus ("USB") 3.0 or via Thunderbolt®.

The networked environment 200 also includes one or more Website user processor-based devices 122 (only one illustrated) and one or more advertiser processor-based devices 131 (only one illustrated) communicably coupled to the one or more processor-based devices 104. The Website user processor-based devices 122 and the advertiser processor-based devices 131 are communicably coupled to the one or more processor-based devices 104 by one or more communications channels, for example one or more wide area networks (WANs) 150. In at least some implementations the WAN includes the Internet over which communications between the Website user processor-based devices 122, the advertiser processor-based devices 131 and the one or more processor-based devices 104 are conducted using an Internet protocol. In operation, the Website user processor-based device 122 and the advertiser processor-based device 131 may include one or more processor-based devices (e.g., desktop computers, laptop computers, ultraportable computers, tablet computers, smartphones, wearable computers) that are directly or indirectly communicably coupled to the one or more processor-based devices 104. The fraudulent advertiser account detection system 108 implemented by the one or more processor-based devices 104 is described herein in the context of a standalone system the fraudulent advertiser account detection system 108 may, in fact, constitute only a portion of the one or more processor-based devices 104 (e.g., a sub-system or module installed in or communicably coupled to the one or more processor-based devices 104). In such instances, components, sub-systems, and resources described forming a portion of the fraudulent advertiser account detection system 108 should be understood as components, sub-systems, and resources that are shared with the one or more processor-based devices 104 or one or more common systems and/or resources that are allocated to the fraudulent advertiser account detection system 108 by the one or more processor-based devices 104.

The networked environment 200 may employ other computer systems and network equipment, for example additional servers, proxy servers, firewalls, routers and/or bridges. The fraudulent advertiser account detection system 108 will at times be referred to in the singular herein, but this is not intended to limit the embodiments to a single system, device, module, or subsystem since in typical embodiments there may be more than one fraudulent advertiser account detection system 108 used at a single time. Unless described otherwise, the construction and operation of the various blocks shown in FIG. 2 are of conventional design. As a result, such blocks need not be described in further detail herein, as they will be understood by those skilled in the relevant art.

The fraudulent advertiser account detection system 108 may include a processor 212, a system memory 214 and a system bus 216 that couples various system components including the system memory 214 to the processor 212. The processor 212 may include any number or combination of logic processing units, such as one or more central processing units (CPUs), microprocessors, single or multi-core processors, digital signal processors (DSPs), application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the fraud detection system 104, such as during start-up.

The one or more processor-based devices 104 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the master node server computer system 202. Although the depicted one or more processor-based devices 104 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214. Such programs may include an operating system 236, one or more application programs 238, other programs or modules 240, and program data 242. Application programs 238 may include one or more processor-executable instructions, logic sets, or programming sufficient to cause the processor 212 to determine a value indicative of an initial probability that an active advertiser account 132 is one of either a valid advertiser account or a fraudulent advertiser account. Application programs 238 may additionally include one or more processor-executable instructions, logic sets, or programming sufficient to cause the processor 212 to determine a value indicative of a likelihood that the presence of one or more advertiser account attribute values 135 and/or one or more combinations of advertiser account attribute values 135 are indicative of or correspond to either of a known valid advertiser account 172 or a suspected or known fraudulent advertiser account 182. Application programs 238 may further include one or more processor-executable instructions, logic sets, or programming sufficient to cause the processor 212 to determine a value indicative of a conditional probability that an active advertiser account 132 is one of either a valid or suspected valid advertiser account or a fraudulent or suspected fraudulent advertiser account based at least in part on the determined initial probabilities and the determined likelihoods as well as the advertiser attribute values 135 and combinations of advertiser attribute values 135 appearing in the account profile 133 logically associated with the respective active advertiser account 132. Application programs 238 may additionally include one or more processor-executable instructions, logic sets, or programming sufficient to cause the processor 212 to autonomously determine whether an active advertiser account 132 flagged by the fraudulent advertiser account detection system 108 as either a valid or suspected valid advertiser account is a known valid advertiser account 172. Application programs 238 may additionally include one or more processor-executable instructions, logic sets, or programming sufficient to cause the processor 212 to autonomously determine whether an active advertiser account 132 flagged by the fraudulent advertiser account detection system 108 as either a fraudulent or suspected fraudulent advertiser account is a known fraudulent advertiser account 182.

While shown in FIG. 2 as being stored in the system memory 214, the operating system 236, application programs 238, other programs/modules 240, program data 242 and browser 244 may be stored in whole or in part on the hard disk 226 of the hard disk drive 224, the optical disk 232 of the optical disk drive 228 and/or the magnetic disk 234 of the magnetic disk drive 230.

A system operator can enter commands and information into the one or more processor-based devices 104 using one or more input devices such as a touch screen or keyboard 246 and/or a pointing device such as a mouse 248, and/or via a graphical user interface. Other input devices can include a microphone, joystick, game pad, tablet, scanner, etc. These and other input devices are connected to the processor 212 through an interface 250 such as a serial interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The one or more processor-based devices 104 may include other output devices, such as speakers, printers, etc.

The one or more processor-based devices 104 can operate in a networked environment using logical connections to one or more remote computers and/or devices. For example, the one or more processor-based devices 104 can operate in a networked environment using logical connections to one or more Website user processor-based devices 122 and to one or more advertiser processor-based devices 131. Communications may be via tethered, wired, and/or wireless network architecture, for instance wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the one or more processor-based devices 104, the one or more Website user processor-based devices 122 and the one or more advertiser processor-based devices 131. The one or more Website user processor-based devices 122 and the one or more advertiser processor-based devices 131 may be communicatively coupled to the one or more processor-based devices 104 through one or more firewalls to an Internet Service Provider or ISP.

The user processor-based devices 122 and the advertiser processor-based devices 131 may include one or more processing units 268a, 268b (collectively 268), system memories 269a, 269b (collectively 269) and a system bus (not shown) that couples various system components including the system memory 269 to the processing unit 268. The Website user processor-based devices 122 and the advertiser processor-based devices 131 will at times each be referred to in the singular herein, but this is not intended to limit the embodiments to a single Website user processor-based device 122 and/or a single advertiser processor-based device 131. In typical embodiments, there will likely be a large number of Website user processor-based devices 122 and more than one advertiser processor-based devices 131.

The processing unit 268 may be any logic processing unit, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks in the processor-based devices 122, 131 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270a, 270b (collectively 270) and random access memory ("RAM") 272a, 272b (collectively 272). A basic input/output system ("BIOS") 271a, 271b (collectively 271), which can form part of the ROM 270, contains basic routines that help transfer information between elements within the end-user computer systems 206, 208, such as during start-up.

The user processor-based devices 122 and the advertiser processor-based devices 131 may also include one or more media drives 273a, 273b (collectively 273), e.g., a hard disk drive, magnetic disk drive, WORM drive, and/or optical disk drive, for reading from and writing to computer-readable storage media 274a, 274b (collectively 274), e.g., hard disk, optical disks, and/or magnetic disks. The computer-readable storage media 274 may, for example, take the form of removable media. For example, hard disks may take the form of a Winchester drives, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program modules and other data for the user processor-based devices 122 and/or the advertiser processor-based devices 131. Although described as employing computer-readable storage media 274 such as hard disks, optical disks and magnetic disks, those skilled in the relevant art will appreciate that end-user computer systems 206, 208 may employ other types of computer-readable storage media that can store data accessible by a computer, such as magnetic cassettes, Universal Serial Bus (USB) storage media, digital video disks ("DVD"), secure digital (SD) storage media, compact flash (CF) storage media, RAMs, ROMs, smart cards, etc. Data or information, for example, electronic or digital documents or files or data (e.g., metadata, ownership, authorizations) related to such can be stored in the computer-readable storage media 274.

Program modules, such as an operating system, one or more application programs, other programs or modules and program data, can be stored in the system memory 269. Program modules may include instructions for accessing a Website hosted on the one or more processor-based devices 104 by the Website operator 102, extranet site or other site or services (e.g., Web services) and associated Web pages, other pages, screens or services hosted by the Website operator 102 on the one or more processor-based devices 104. Program modules may include instructions for storing certain or selected electronic correspondence and/or electronic or digital documents or files or changes thereto to nontransitory computer- or processor readable storage medium, such as local media 274a, 274b. Alternatively, the instructions may cause retrieval of electronic correspondence and/or electronic or digital documents or files or changes to existing electronic correspondence and/or electronic or digital documents or files. Program modules may additionally include instructions for handling security such as ownership, password or other access protection and communications encryption.

The system memory 269 may also include other communications programs, for example a Web client or browser that permits the user processor-based devices 122 and the advertiser processor-based devices 131 to access and exchange data with sources such as Internet Websites, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. A Website user 120 provides input to the user processor-based devices 122 and an advertiser 130 provides input to the advertiser processor-based devices 131 via a user interface 275a, 275b (collectively 275); via one or more input devices such as a touch screen or keyboard 276a, 276b (collectively 276); and/or via a pointing device 277a, 277b (collectively 277) such as a mouse, trackball, or motion sensing input device. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278a, 278b (collectively 278) may be coupled to the system bus via a video interface, such as a video adapter. The satellite node server computer system 206 can include other output devices, such as speakers, printers, etc.

Figure 3A:
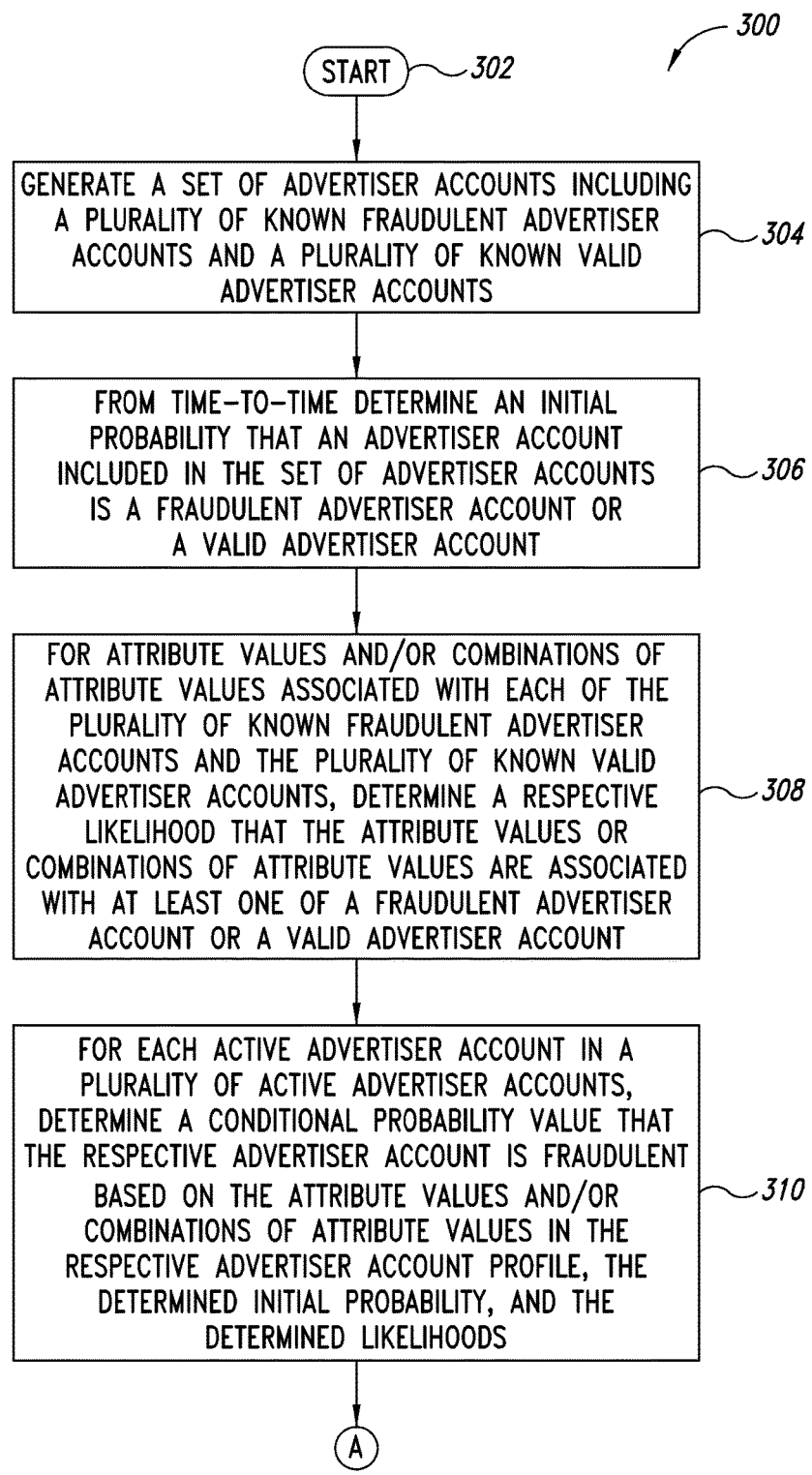
FIGS. 3A and 3B are a flow diagram showing a high-level method of determining a probability that advertiser account profile is a fraudulent or valid advertiser account, determining a likelihood that attribute values or combinations of attribute values are indicative of a particular advertiser account as either fraudulent or valid, determining a conditional probability that an active advertiser account is fraudulent, and designating advertising accounts as fraudulent, valid or requiring additional review, according to one illustrated embodiment.
Figure 3B:
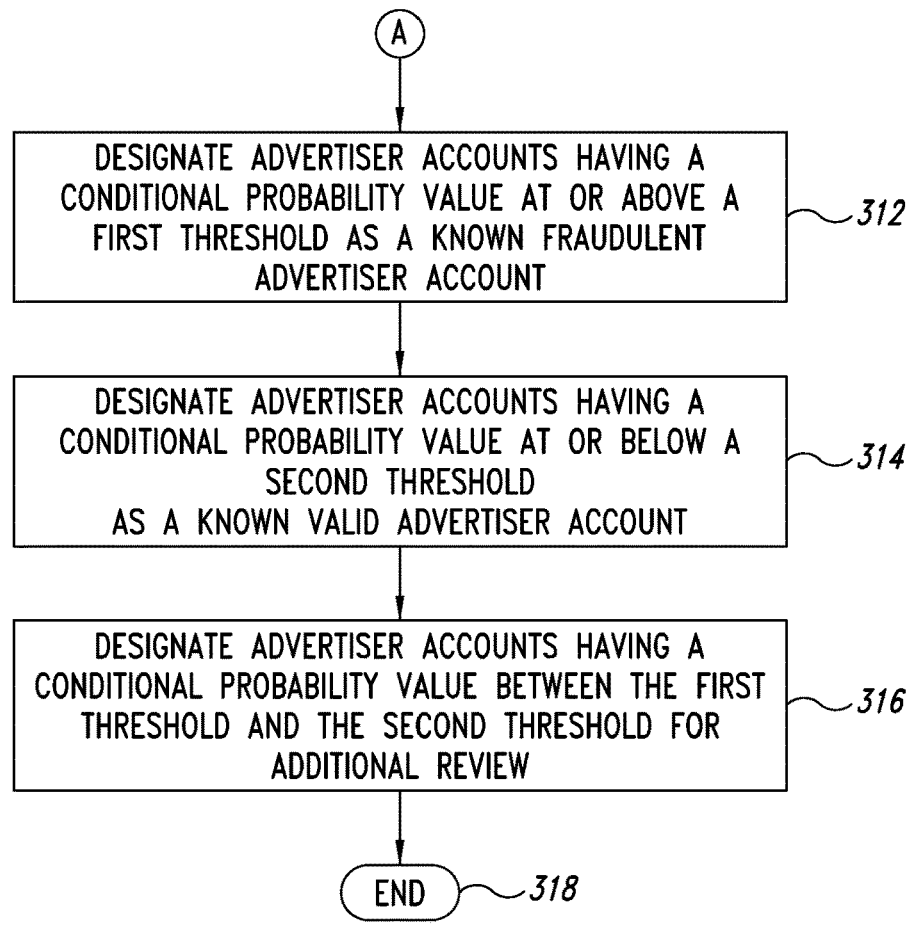

FIGS. 3A and 3B show a high-level method 300 of determining of a conditional probability value indicative of whether an active advertiser account 132 included in a plurality of active advertiser accounts 190 is one of either a valid or suspected valid advertiser account or a fraudulent or suspected fraudulent advertiser account, according to one illustrated embodiment. Over time, a number of active advertisers 130 may create active advertiser accounts 132 with a Website operator 102 in order to place "creatives" or advertisements 136 on Web pages 124 delivered by the one or more processor-based devices 104 to any number of Web users 120. At any given time, a number of such active advertisers 130 may be considered valid advertisers who have provided a valid or authorized payment card to fund the placement of advertising 136 on the Web pages 124. Additionally, at any given time, a number of such active advertisers 120 may be considered fraudulent advertisers who have provided an invalid or unauthorized payment card to fund the placement of advertising 136 on the Web pages 124.

The fraudulent advertiser account detection system 108 determines and logically associates a conditional probability value with some or all of the active advertiser accounts 132 included in the plurality of active advertiser accounts 190. In some instances, the conditional probability value logically associated with an active advertiser account 132 is indicative of whether the respective active advertiser account 132 is one of either a valid or suspected valid advertiser account or a fraudulent or suspected fraudulent advertiser account. In some instances, the conditional probability value logically associated with an active advertiser account 132 is indicative of whether the respective active advertiser account 132 is one of either a known valid advertiser account 172 or a known fraudulent advertiser account 182.

Active advertiser accounts 132 logically associated with a conditional probability value at or above a first defined threshold are flagged by the fraudulent advertiser account detection system 108 as at least one of either a fraudulent or suspected fraudulent advertiser account or a known fraudulent advertiser account 182. In some instances, the fraudulent advertiser account detection system 108 autonomously halts or otherwise suspends payment processing of a deposit made by a fraudulent or suspected fraudulent advertiser account or by a known fraudulent advertiser account 182. In some instances, the fraudulent advertiser account detection system 108 can prevent the placement of advertising 136 logically associated with a fraudulent or a suspected fraudulent advertiser account or with a known fraudulent advertiser account 182 on Webpages 124 delivered by the one or more processor-based devices 104.

Active advertiser accounts 132 logically associated with a conditional probability value at or below a second defined threshold are flagged by the fraudulent advertiser account detection system 108 as at least one of either a valid or suspected valid advertiser account or a known valid advertiser account 182. Some or all of the active advertiser accounts 132 so flagged by the fraudulent advertiser account detection system 108 are retained in the plurality of active advertiser accounts 190. In some instances, the fraudulent advertiser account detection system 108 autonomously approves payment processing of a deposit made by a valid or suspected valid advertiser account or by a known valid advertiser account 172. In some instances, the fraudulent advertiser account detection system 108 places advertising 136 logically associated with a valid or a suspected valid advertiser account or with a known valid advertiser account 172 on Webpages 124 delivered by the one or more processor-based devices 104.

Active advertiser accounts 132 logically associated with a probability that falls between the first defined threshold and the second defined threshold are flagged by the fraudulent advertiser account detection system 108 for additional review which may include manual, semi-automated, or automated review to determine whether the active advertiser account 132 is a known valid advertiser account 172 or a known fraudulent advertiser account 182. The method 300 of determining a value indicative of the probability that an active advertiser account 132 is one of either a known valid advertiser account 172 or a known fraudulent advertiser account 182 commences at 302.

At 304, the fraudulent advertiser account detection system 108 generates one or more sets of advertiser accounts 160. Each of the one or more sets of advertiser accounts 160 may include a plurality of known valid advertiser accounts 170 and a plurality of known fraudulent advertiser accounts 180. In some instances, the set of advertiser accounts 160 includes some or all of the active advertiser accounts 132 included in the plurality of active advertisers 190, which may include some or all known valid advertiser accounts 172 and some or all known fraudulent advertiser accounts 182. In other instances, the set of advertiser accounts 160 may exclude active advertiser accounts 132 created outside of one or more defined temporal ranges (e.g., active advertiser accounts 132 created within the 2 weeks preceding the system date of the one or more processor-based devices 104).

For example, in some implementations, the set of advertiser accounts 160 may exclude at least some new advertiser accounts 132 created over a defined vetting interval. Examples of such excluded new advertiser accounts 132 include advertiser accounts 132 associated with unverified advertisers 130 and/or advertiser accounts 132 associated with disabled advertisers included in the plurality of active advertisers 190. Examples of such vetting intervals include, but are not limited to, advertiser accounts 132 created within the last 30 days; the last 15 days; the last 7 days, or the last 3 days preceding the system date of the one or more processor-based devices 104.

In another example, in some implementations, the set of advertiser accounts 160 may include some or all known valid advertiser accounts 172 included in the plurality of active advertisers 190 and some or all known fraudulent advertiser accounts 182 created over one or more defined time intervals. Examples of such defined time intervals include, but are not limited to, advertiser accounts created within: the last 3 months, the last 6 months, the last year, the last two years, or the last three years. Limiting membership in the plurality of known valid advertiser accounts 170 and the plurality of known fraudulent advertiser accounts 180 advantageously limits the influence advertiser account attribute values 135 associated with older advertiser accounts and permits a more rapid detection of newly developing trends in advertiser account attribute values 135 associated with recently created active advertiser accounts 132. Such early detection beneficially permits the determination of conditional probability values by the fraudulent advertiser account detection system 108 that reflect current trends in attribute values 135 and/or combinations of attribute values 135 associated with known fraudulent advertiser accounts 182. Such early detection also permits the Website operator 102 to prevent the payment processor from processing payments received from active advertisers 130 logically associated with an active advertiser account 132 flagged by the fraudulent advertiser account detection system 108 as either a fraudulent or suspected fraudulent advertiser account or a known fraudulent advertiser account 182. By preventing payment processing on fraudulent advertiser accounts the number of chargebacks assessed to the Website operator by the payment processor is minimized or even eliminated.

At 306, from time-to-time the fraudulent advertiser account detection system 108 determines at a periodic or an aperiodic interval a value indicative of an initial probability that an advertiser account included in the set of advertiser accounts 160 is at least one of a valid advertiser account or a fraudulent advertiser account.

Within the set of advertiser accounts 160, the plurality of known valid advertiser accounts 170 includes a number of known valid advertiser account 172a-172n each having a respective, logically associated, advertiser profile 174a-174n and the plurality of known fraudulent advertiser accounts 180 includes a number of known fraudulent advertiser accounts 182a-182n each having a respective, logically associated, advertiser profile 184a-184n. Each of the advertiser profiles 174, 184 include a number of advertiser account attributes 134a-134n, some or all of which have one or more advertiser account attribute values 135a-135n logically associated therewith. Note that in some instances an advertiser account attribute may include a null or empty value if the account attribute is inapplicable to the respective advertiser account (e.g., prior to making a deposit into an advertiser account, an advertiser may not have one or more attribute values related to credit card processing). To facilitate the subsequent discussion of the determination of initial probabilities, likelihoods, and conditional probabilities, consider the representation of advertiser account attribute values 135 logically associated with each respective known valid advertiser account 172 and each respective known fraudulent advertiser account 182 as a vector quantity:

$$x_j^{(i)} = \{x_{j,1}^{(i)}, x_{j,2}^{(i)}, \ldots, x_{j,p}^{(i)}\} \quad (1)$$

where:

$x_{j,1}^{(i)}$=the $1^{st}$ attribute value for the $j^{th}$ attribute in advertiser account i $x_{j,2}^{(i)}$=the $2^{nd}$ attribute value for the $j^{th}$ attribute in advertiser account i $x_{j,p}^{(i)}$=the $p^{th}$ attribute value for the $j^{th}$ attribute in advertiser account i The value indicative of the initial probability that an advertiser account included in the set of advertiser accounts 160 is a valid advertiser account is given by:

$$p(y = V) = \frac{\sum_{i=1}^{m} 1\{y^{(i)} = V\}}{m} \quad (2)$$

where:

m=total number of advertiser accounts in the set of advertiser accounts 160

$y^{(i)} \in \{$S (fraudulent advertiser account), V (valid advertiser account)$\}$ 1{ . . . }=identity operator (i.e., for each valid account, count increases by 1)

The value indicative of the initial probability that an advertiser account included in the set of advertiser accounts 160 is a fraudulent advertiser account is given by:

$$p(y = S) = \frac{\sum_{i=1}^{m} 1\{y^{(i)} = S\}}{m} \quad (3)$$

where:

m=total number of advertiser accounts in the set of advertiser accounts 160

$y^{(i)} \in \{$S (fraudulent advertiser account), V (valid advertiser account)$\}$ 1{ . . . }=identity operator (i.e., for each fraudulent account, count increases by 1)

From time-to-time, the fraudulent advertiser account detection system 108 can determine a value indicative of an initial probability that an advertiser account included in the set of advertiser accounts 160 is a fraudulent advertiser account 182 and a value indicative of an initial probability that an advertiser account included in the set of advertiser accounts 160 is a fraudulent advertiser account 182. In such instances, the value indicative of the initial probabilities is determined using both equation (2) and equation (3) above.

At 308, from time-to-time at periodic or aperiodic intervals, the fraudulent advertiser account detection system 108 autonomously determines a likelihood that the presence of one or more respective attribute values 135 or one or more respective combinations of attribute values 135 logically associated with an active advertiser account 132 are indicative of at least one of a valid advertiser account or a fraudulent advertiser account. The likelihood that the logical association of one or more attribute values 135 or the logical association of one or more combinations of attribute values 135 with an active advertiser account 132 is indicative of a valid advertiser account is given by:

$$p(x_j^{(i)} | y = V) = \frac{\sum_{i=1}^{m} \sum_{k=1}^{p} 1\{x_{j,k}^{(i)}, y = V\} + 1}{\sum_{i=1}^{m} 1\{y^{(i)} = V\}p + |d_j|} \quad (4)$$

where:

$\Sigma_{i=1}^{m} 1\{x_{j,k}^{(i)}, y=V\}$=number of valid advertisers with attribute value $x_{j,k}^{(i)}$; or combination of attribute values $x_{j,k}^{(i)}$ $|d_j|$=the size of the set of the attribute value j The likelihood that the logical association of one or more attribute values 135 or the logical association of one or more combinations of attribute values 135 with an active advertiser account 132 is indicative of a fraudulent advertiser account is given by:

$$p(x_j^{(i)} | y = S) = \frac{\sum_{i=1}^{m} \sum_{k=1}^{p} 1\{x_{j,k}^{(i)}, y = S\} + 1}{\sum_{i=1}^{m} 1\{y^{(i)} = S\}p + |d_j|}. \quad (5)$$

where:

$\Sigma_{i=1}^{m} 1\{x_{j,k}^{(i)}, y=S\}$=number of fraudulent advertisers with attribute value $x_{j,k}^{(i)}$; or combination of attribute values $x_{j,k}^{(i)}$ $|d_j|$=number of discrete values for attribute value j Equations (4) and (5) provide values indicative of the likelihood that an active advertiser account 132 having one or more respective attribute values 135 ($x_{j,k}^{(i)}$) or one or more respective combinations of attribute values 135 ($x_{j,k}^{(i)}$) logically associated therewith is at least one of a valid advertiser account (equation (4)) or a fraudulent advertiser account (equation (5)).

At 310, from time-to-time at periodic or aperiodic intervals, the fraudulent advertiser account detection system 108 autonomously determines a respective conditional probability value indicative of whether an active advertiser account 132 is one of either a valid advertiser account 172 or a fraudulent advertiser account 182 using the determined initial probabilities p(y=V) and p(y=S) [i.e., equations (2) and (3)], the determined likelihoods $p(x_j^{(i)}|y=V)$ and $p(x_j^{(i)}|y=S)$ [i.e., equations (4) and (5)], and the attribute values 135 or combinations of attribute values 135 included in the advertiser account profile 133 logically associated with the respective advertiser account 132.

The value indicative of the conditional probability that an active advertiser account 132 is a fraudulent advertiser account 172 based on one or more advertiser account attribute values 135 and/or one or more combinations of advertiser account attribute values 135 is given by the Bayesian formula:

$$p(y = S | x^{(i)}) = \frac{p(y = S)\prod_{j=1}^{n} p(x_j^{(i)} | y = S)}{p(y = S)\prod_{j=1}^{n} p(x_j^{(i)} | y = S) + p(y = V)\prod_{j=1}^{n} p(x_j^{(i)} | y = V)} \quad (6)$$

The conditional probability returned by equation (6) is indicative of whether an active advertiser account 132 is a fraudulent advertiser account 182. In some instances, the greater the returned conditional probability the greater the likelihood that the active advertiser account 132 is a fraudulent advertiser account 182. The lesser the returned conditional probability value, the lesser the likelihood that the active advertiser account 132 is a fraudulent advertiser account 182 (i.e., the active advertiser account is a valid advertiser account 172).

The Bayesian formula (Equation (6)) may be used to determine a value indicative of a conditional probability that a respective advertiser account is a fraudulent advertiser account for some or all of the active advertisers included in the plurality of active advertisers 190. The Bayesian formula advantageously depends only on the attribute values 135 and/or combinations of attribute values included in the account profile 133 logically associated with the respective active advertiser account 132. In some instances, conditional probabilities for active advertiser accounts 132 created within, over, or across a defined time period (e.g., within the two weeks preceding the system date of the one or more processor-based devices 104) may be determined. In some instances, conditional probability values for known valid advertiser accounts 172 included in the plurality of active advertisers 190 may be determined from time-to-time, for example at a periodic or an aperiodic interval.

The determined initial probabilities p(y=V) and p(y=S) and the determined likelihoods $[p(x_j^{(i)}|y=V)]$ and $[p(x_j^{(i)}|y=S)]$ are autonomously determined and/or updated by the fraudulent advertiser account detection system 108 on an ongoing basis. Thus, the conditional probability $p(y=S|x^{(i)})$ that a particular active advertiser account 132 one of a known valid advertising account 172 or a known fraudulent advertising account 182 is also advantageously determined or updated in near-real time based at least in part on those attribute values 135 and/or combinations of attribute values 135 included in the account profile 133 logically associated with the respective active advertiser account 132.

At 312, the fraudulent advertiser account detection system 108 compares the determined conditional probability value logically associated with respective ones of the active advertiser accounts 132 included in the plurality of active advertiser accounts 190 to a first defined threshold value. Should the determined conditional probability value fall at or above the first determined threshold value, the fraudulent advertiser account detection system 108 flags the respective active advertiser account 132 as a known fraudulent advertiser account 182.

At 314, the fraudulent advertiser account detection system 108 compares the determined conditional probability value logically associated with respective ones of the active advertiser accounts 132 included in the plurality of active advertiser accounts 190 to a second defined threshold value. Should the determined conditional probability value fall at or below the second determined threshold value, the fraudulent advertiser account detection system 108 flags the respective active advertiser account 132 as a known valid advertiser account 182.

At 316, the fraudulent advertiser account detection system 108 flags active advertiser accounts having a determined conditional probability falling between the first defined threshold value and the second defined threshold value for additional review prior to making a dispositive determination of whether the respective active advertiser account 132 as a known valid advertiser account 172 or a known fraudulent advertiser account 182. The method 300 of determining a value indicative of the probability that an active advertiser account 132 is one of either a known valid advertiser account 172 or a known fraudulent advertiser account 182 terminates at 318.

Figure 4:
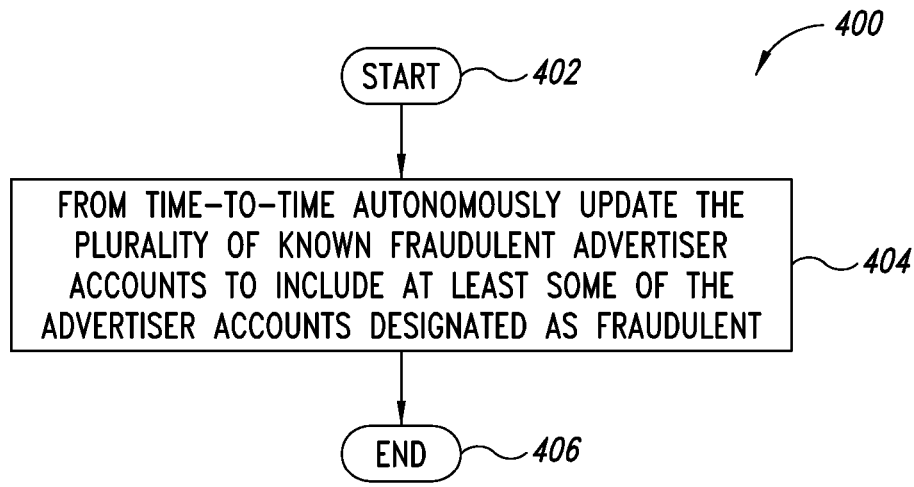
FIG. 4 is a flow diagram showing a low-level method of autonomously updating the plurality of known fraudulent advertiser accounts to include at least some of the plurality of active advertiser accounts with conditional probability values at or above a defined first threshold and designated as fraudulent, according to one illustrated embodiment.

FIG. 4 shows a low-level method 400 of autonomously updating the plurality of known fraudulent advertiser accounts 180 to include at least some of the active advertiser accounts 132 having logically associated conditional probability values at or above a defined first threshold value (i.e., known fraudulent advertising accounts 182), according to one embodiment. As the fraudulent advertiser account detection system 108 determines the respective conditional probability value for some or all of the active advertiser accounts 132 included in the plurality of active advertisers 190 indicate the respective active advertiser account 132 is a suspected or known fraudulent advertiser account 182, in at least some instances the fraudulent advertiser account detection system 108 may add the respective active advertiser account 132 to the plurality of known fraudulent advertiser accounts 180. The method 400 of autonomously updating the plurality of known fraudulent advertiser accounts 180 included in the set of advertiser accounts 160 with active advertiser accounts 132 having a determined conditional probability at or above the first defined threshold commences at 402.

At 404, from time-to-time at periodic or aperiodic intervals, the fraudulent advertiser account detection system 108 updates the plurality of known fraudulent advertiser accounts 180 with at least some of the active advertiser accounts 132 having a determined conditional probability at or above the first defined threshold (i.e., those active advertiser accounts flagged by the fraudulent advertiser account detection system 108 as a known fraudulent advertiser account 182 at 312, see FIGS. 3A & 3B).

Since the fraudulent advertiser account detection system 108 periodically or aperiodically updates the plurality of known fraudulent advertiser accounts 180, advertiser account attribute values 135 associated with known fraudulent advertiser accounts 182 are advantageously maintained by the fraudulent advertiser account detection system 108 on a near-real time basis. Such near-real time updating beneficially permits the early detection of evolving trends in advertiser account attribute values that characterize fraudulent advertising accounts 182, thereby improving the detection capability of the fraudulent advertiser account detection system 108 and increasing confidence in the active advertiser accounts flagged as known fraudulent advertising accounts 182 by fraudulent advertiser account detection system 108. The method 400 of autonomously updating the plurality of known fraudulent advertiser accounts 180 included in the set of advertiser accounts 160 with active advertiser accounts 132 having a determined conditional probability at or above the first defined threshold terminates at 406.

Figure 5:
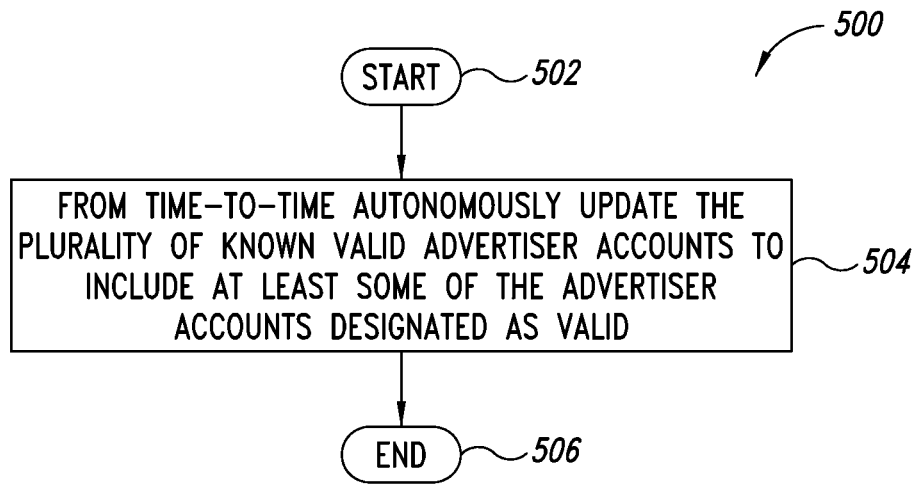
FIG. 5 is a flow diagram showing a low-level method of autonomously updating the plurality of known valid advertiser accounts to include at least some of the plurality of active advertiser accounts with conditional probability values at or below a defined second threshold and designated as valid, according to one illustrated embodiment.

FIG. 5 shows a low-level method 500 of autonomously updating the plurality of known valid advertiser accounts 170 to include at least some of the plurality of active advertiser accounts with conditional probability values at or below a defined second threshold value and designated as valid by the fraudulent advertiser account detection system 108, according to one embodiment. When the fraudulent advertiser account detection system 108 determines the conditional probability associated with an active advertiser account 132 included in the plurality of active advertisers 190 is indicative of a known valid advertiser account 172, in at least some instances the fraudulent advertiser account detection system 108 may add the respective known valid advertiser account 172 to the plurality of known valid advertiser accounts 170 included in the set of advertiser accounts 160. The method 500 of autonomously updating the plurality of known valid advertiser accounts 170 included in the set of advertiser accounts 160 with active advertiser accounts 132 having an associated determined conditional probability at or below the second defined threshold value commences at 502.

At 504, from time-to-time, at either of periodic or aperiodic intervals, the fraudulent advertiser account detection system 108 updates the plurality of known valid advertiser accounts 170 with at least some of the active advertiser accounts 132 having an associated determined conditional probability value at or below the second defined threshold value (i.e., those active advertiser accounts flagged by the fraudulent advertiser account detection system 108 as a known valid advertiser account 182 at 314, see FIGS. 3A & 3B).

Since the fraudulent advertiser account detection system 108 periodically or aperiodically updates the plurality of known valid advertiser accounts 170, advertiser account attribute values 135 associated with known valid advertiser accounts 172 are advantageously maintained by the fraudulent advertiser account detection system 108 on a near-real time basis. Such near-real time updating beneficially permits the early detection of evolving trends in advertiser account attribute values that characterize valid advertising accounts 172, improving the detection capability of the fraudulent advertiser account detection system 108 and increasing confidence in the active advertiser accounts flagged as known valid advertising accounts 172 by fraudulent advertiser account detection system 108. The method 500 of autonomously updating the plurality of known valid advertiser accounts 170 included in the set of advertiser accounts 160 with active advertiser accounts 132 having a determined conditional probability value at or below the second defined threshold value terminates at 506.

Figure 6:
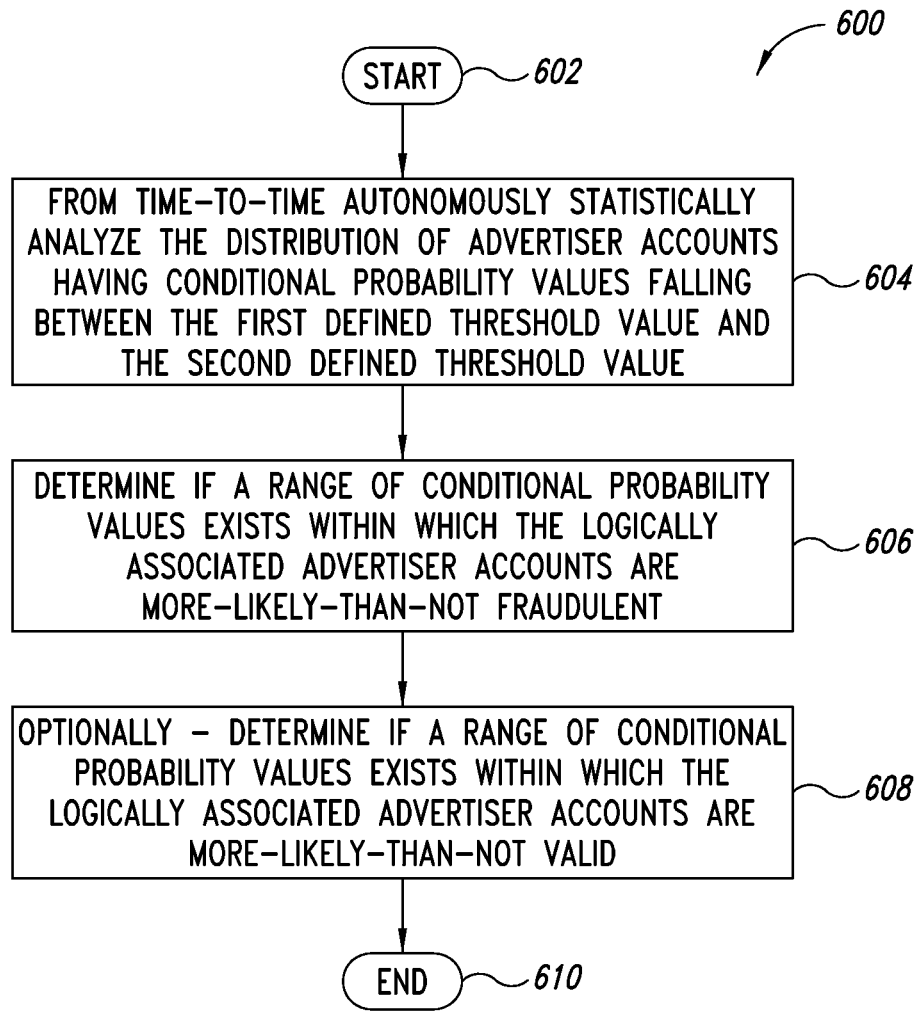
FIG. 6 is a flow diagram showing a low-level method of statistically evaluating the distribution of advertiser accounts having conditional probability values falling between the defined first threshold and the defined second threshold and determining if a range of conditional probability values exists for which the respective advertiser accounts are more-likely-than-not fraudulent, according to one illustrated embodiment.

FIG. 6 shows a low-level method 600 of statistically analyzing the active advertiser accounts associated with conditional probability values falling between the first defined threshold value and the second defined threshold value, according to one embodiment. Active advertiser accounts falling between the first defined threshold value and the second defined threshold value cannot be immediately classified by the fraudulent advertiser account detection system 108 as either a known valid advertiser account 172 or a known fraudulent advertiser account 182. Thus, the active advertiser accounts 132 having conditional probability values falling between the first and the second defined threshold values may require time consuming and potentially costly automated to manual follow-up to determine whether the respective advertising account is valid or fraudulent. Additionally, if those active advertiser accounts 132 associated with conditional probability values falling between the first and the second defined threshold values are maintained in an active state (i.e., permitted to place advertisements 136 on Webpages 124 delivered to Website users 120) and are ultimately determined to be fraudulent, those advertisers will have been permitted to operate during the review period, potentially exposing the Website operator to an increased number of chargebacks and lost advertising revenue. Conversely, if those active advertiser accounts 132 associated with conditional probability values falling between the first and the second defined threshold values are maintained in an suspended or disabled state (i.e., not permitted to place advertisements 136 on Webpages 124 delivered to Website users 120) and are ultimately determined to be valid, those valid advertisers will not have been permitted to operate during the review period, potentially increasing advertiser dissatisfaction with the Website operator and potential loss of advertising revenue.

In at least some instances, the fraudulent advertiser account detection system 108 may statistically analyze the distribution of conditional probability values falling between the first defined threshold value and the second defined threshold value to detect the existence of one or more ranges of conditional probability values falling between the first defined threshold value and the second defined threshold value in which the advertising accounts are more likely than not at least one of a known valid advertising account 172 or a known fraudulent advertising account 182. The method of statistically analyzing the active advertiser accounts associated with conditional probability values falling between the first defined threshold value and the second defined threshold value commences at 602.

At 604, the fraudulent advertiser account detection system 108 from time-to-time at periodic or aperiodic intervals autonomously statistically analyzes the historical distribution of advertiser accounts logically associated with conditional probability values falling between the first defined threshold value and the second defined threshold value.

At 606, the fraudulent advertiser account detection system 108, from time-to-time at periodic or aperiodic intervals, autonomously determines if one or more ranges of conditional probability values falling between the first defined threshold value and the second defined threshold value exist in which the advertiser accounts logically associated with the respective conditional probabilities were ultimately determined to be more-likely-than-not fraudulent advertiser accounts 182.

At 608, the fraudulent advertiser account detection system 108 may optionally, from time-to-time at periodic or aperiodic intervals, autonomously determine if one or more ranges of conditional probability values falling between the first defined threshold value and the second defined threshold value exist in which the advertiser accounts logically associated with the respective conditional probabilities were ultimately determined to be more-likely-than-not valid advertiser accounts 182. The method of statistically analyzing the active advertiser accounts associated with conditional probability values falling between the first defined threshold value and the second defined threshold value terminates at 610.

Figure 7:
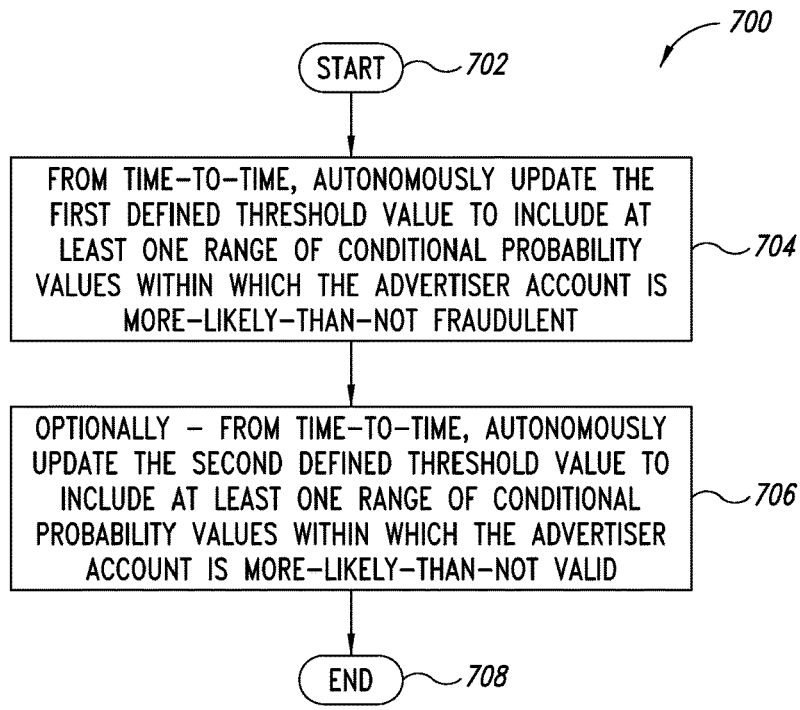
FIG. 7 is a flow diagram showing a low-level method of autonomously updating the defined first threshold to include the range of conditional probabilities in which the respective advertiser accounts are more-likely-than-not fraudulent, according to one illustrated embodiment.

FIG. 7 shows a low-level method 700 of updating at least the first defined threshold value to include a range of conditional probability values falling between the first defined threshold value and the second defined threshold value for which the logically associated active advertiser account 132 was subsequently determined to be a fraudulent advertiser account 182, according to one embodiment. Upon detecting the existence of a range of conditional probability values falling between the first defined threshold value and the second defined threshold value in which the advertising accounts are more likely than not a known fraudulent advertising account 182, the fraudulent advertiser account detection system 108 may autonomously adjust the first defined threshold value to include the respective range. Optionally, upon detecting the existence of a range of conditional probability values falling between the first defined threshold value and the second defined threshold value in which the advertising accounts are more likely than not a known valid advertising account 172, the fraudulent advertiser account detection system 108 may autonomously adjust the second defined threshold value to include the respective range. The method 700 of updating at least the first defined threshold value to include a range of conditional probability values falling between the first defined threshold value and the second defined threshold value for which the logically associated active advertiser accounts 132 were subsequently determined to be a fraudulent advertiser account 182 commences at 702.

At 704, the fraudulent advertiser account detection system 108, from time-to-time at periodic or aperiodic intervals, autonomously updates the first defined threshold value to include at least one range of conditional probability values falling between the first defined threshold value and the second defined threshold value in which the advertising accounts are more likely than not a known fraudulent advertising account 182.

At 706, the fraudulent advertiser account detection system 108 may optionally, from time-to-time at periodic or aperiodic intervals, autonomously update the second defined threshold value to include at least one range of conditional probability values falling between the first defined threshold value and the second defined threshold value in which the advertising accounts are more likely than not a known valid advertising account 172. The method 700 of updating at least the first defined threshold value to include a range of conditional probability values falling between the first defined threshold value and the second defined threshold value for which the logically associated active advertiser accounts 132 were subsequently determined to be a fraudulent advertiser account 182 terminates at 708.

Figure 8:
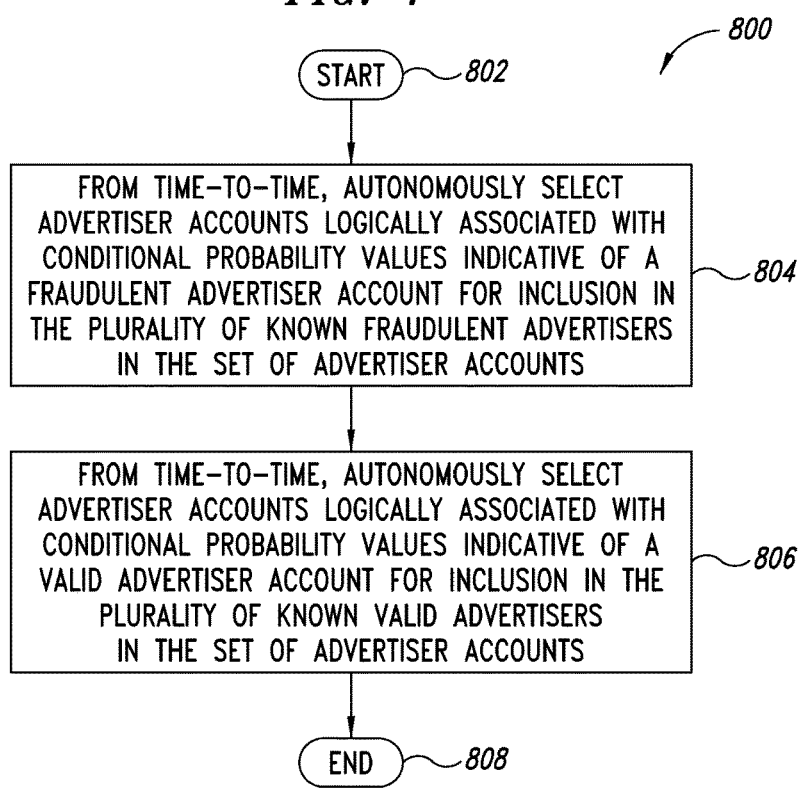
FIG. 8 is a flow diagram showing a low-level method of autonomously selecting advertiser accounts for inclusion in the set of advertiser accounts used to determine the initial probabilities and likelihoods, according to one illustrated embodiment.

FIG. 8 shows a low-level method 800 of updating the plurality of known valid advertiser accounts 170 with active advertiser accounts 132 determined valid based on the conditional probability value associated with the respective advertiser account and updating the plurality of known fraudulent advertiser accounts 180 with active advertiser accounts 132 determined fraudulent based on the conditional probability value associated with the respective advertiser account. From time-to-time on a periodic or an aperiodic basis, the fraudulent advertiser account detection system 108 autonomously updates both the plurality of known valid advertiser accounts 170 and the plurality of known fraudulent advertiser accounts 180 with active advertiser accounts based at least in part on the determined conditional probability values associated with each respective active advertiser account 132. In some instances, the fraudulent advertiser account detection system 108 also updates both the plurality of known valid advertiser accounts 170 and the plurality of known fraudulent advertiser accounts 180 with active advertiser accounts 132 having logically associated conditional probability values falling between the first defined threshold value and the second defined threshold value after a review and determination of whether such accounts are either a known fraudulent advertiser account 182 or a known valid advertiser account 172. The method 800 of updating the plurality of known valid advertiser accounts 170 and the plurality of known fraudulent advertiser accounts 180 using active advertiser accounts 132 based on the conditional probability value associated with each respective one of the active advertiser accounts 132 commences at 802.

At 804, the fraudulent advertiser account detection system 108, from time-to-time at periodic or aperiodic intervals, autonomously selects for inclusion in the plurality of known fraudulent advertisers 180 those active advertiser accounts 132 having a logically associated conditional probability value indicative of a known fraudulent advertising account 182 (e.g., a logically associated conditional probability at or above the first threshold value) and/or those active advertiser accounts 132 determined after review to be a known fraudulent advertiser account 182.

At 806, the fraudulent advertiser account detection system 108, from time-to-time at periodic or aperiodic intervals, autonomously selects for inclusion in the plurality of known valid advertisers 170 those active advertiser accounts 132 having a logically associated conditional probability value indicative of a known valid advertising account 172 (e.g., a logically associated conditional probability at or below the second threshold value) and/or those active advertiser accounts 132 determined after review to be a known valid advertiser account 172. The method 800 of updating the plurality of known valid advertiser accounts 170 and the plurality of known fraudulent advertiser accounts 180 using active advertiser accounts 132 based on the conditional probability value associated with each respective one of the active advertiser accounts 132 terminates at 808.

Figure 9:
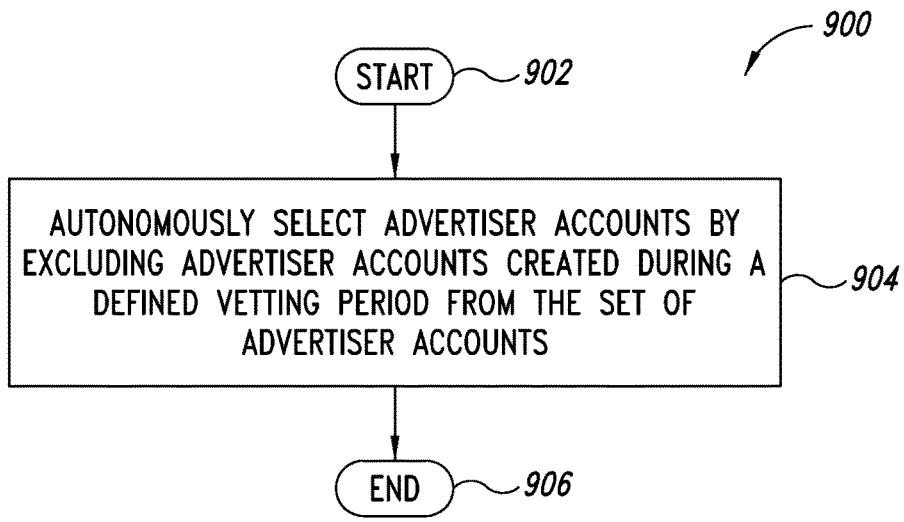
FIG. 9 is a flow diagram showing a low-level method of autonomously selecting advertiser accounts for inclusion in the set of advertiser accounts used to determine the initial probabilities and likelihoods by excluding advertiser accounts created during a defined vetting period, according to one illustrated embodiment.

FIG. 9 shows a low-level method 900 of updating the set of advertiser accounts 160 by autonomously excluding those active advertiser accounts created within a defined vetting period from inclusion in either the plurality of known valid advertiser accounts 170 or the plurality of known fraudulent advertiser accounts 180, according to one embodiment. In some instances, all or a portion of newly created active advertiser accounts 132 created over a defined vetting interval may be autonomously excluded from the set of advertiser accounts 160.

In some instances, such excluded active advertiser accounts may include only a limited number of active advertiser accounts 132 meeting one or more defined criteria and which were created over the defined vetting period. For example, in one implementation only those active advertiser accounts 132 meeting the criteria of being unverified over the defined vetting interval are excluded from the set of advertising accounts 160. Such exclusions advantageously limit the ability of attribute values 135 or combinations of attribute values 135 appearing in advertising account profiles 133 logically associated with active advertising accounts 132 created over the defined vetting period from skewing or improperly weighting the determined conditional probability value for each of the respective active advertisers 132 included in the plurality of active advertiser accounts 190.

The defined vetting period may include one or more time intervals and may be of any temporal duration. In at least one embodiment, the defined vetting period extends two weeks prior to the determination of a conditional probability value for each of the active advertiser accounts included in the plurality of active advertiser accounts 190. The method 900 of excluding at least some active advertiser accounts 132 created over a defined vetting period from inclusion in the set of advertiser accounts 160 commences at 902.

At 904, the fraudulent advertiser account detection system 108, from time-to-time at periodic or aperiodic intervals, autonomously excludes from the set of advertiser accounts 160, those active advertiser accounts 132 created over a defined vetting interval. In some instances, the fraudulent advertiser account detection system 108 may additionally or alternatively exclude from inclusion in the set of advertiser accounts 160 those active advertiser accounts created during the defined vetting period and meeting one or more defined criteria. Such may, for example, permit the fraudulent advertiser account detection system 108 to autonomously exclude those active advertiser accounts 132 created during the defined vetting period and/or those active advertiser accounts 132 that have not yet been verified by the fraudulent advertiser account detection system 108. The method 900 of excluding at least some active advertiser accounts 132 created over a defined vetting period from inclusion in the set of advertiser accounts 160 terminates at 906.

Figure 10:
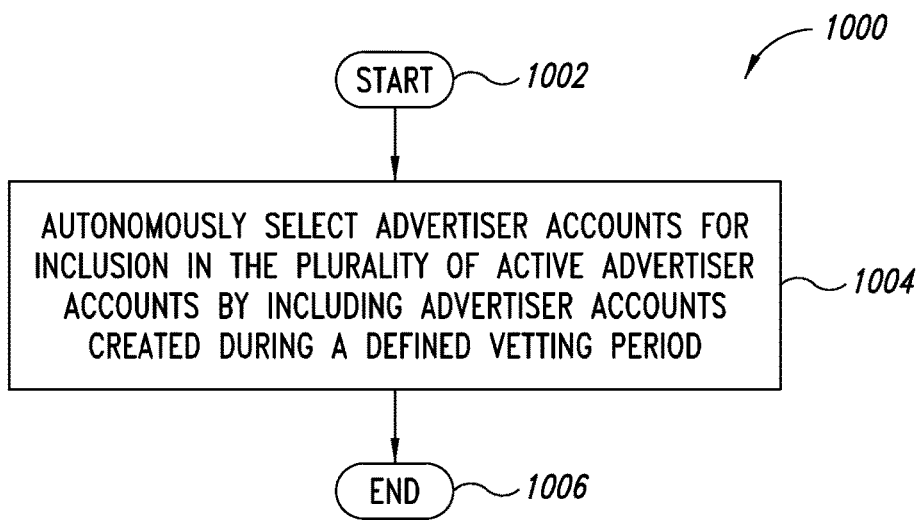
FIG. 10 is a flow diagram showing a low-level method of autonomously selecting advertiser accounts for inclusion in the set of advertiser accounts used to determine the initial probabilities and likelihoods by including a number of advertiser accounts created during a defined vetting period, according to one illustrated embodiment.

FIG. 10 shows a low-level method 1000 of updating the plurality of active advertiser accounts 190 by autonomously including those active advertiser accounts created within a defined vetting period, according to one embodiment. In some instances, all or a portion of newly created active advertiser accounts 132 created over a defined vetting interval may be autonomously included in the plurality of active advertiser accounts 190.

In some instances, the active advertiser accounts 132 created during the defined vetting period and included in the plurality of active advertiser accounts 190 may include only a limited number of active advertiser accounts 132 meeting one or more defined criteria. Including such newly created advertiser accounts in the plurality of active advertiser accounts 190 advantageously permits the determination of a conditional probability value for the respective newly created active advertiser account and the potential of early identification of newly created fraudulent advertiser accounts. For example, the Website operator 102 may "verify" an advertiser 130 upon receipt of a cleared payment by the Website operator's payment processor. However, if payment is received by the Website operator 102 and the active advertiser account 132 is subsequently found to have been created using a fraudulent payment method, such chargebacks are counted against the Website operator 102 and may result in higher processing costs or even suspension of payment processing services, thereby stranding the Website operator 102 without a means for processing payments from any advertiser 130.

Thus, it may be advantageous for the Website operator 102 to identify newly created, potentially fraudulent, active advertiser accounts 132 prior to verification via payment processing. The early identification of potentially fraudulent active advertiser accounts 132 prior to such verification permits the Website operator 102 to reverse the payment provided by the advertiser logically associated with the respective active advertiser account 132, thereby avoiding a chargeback from the Website operator's payment processor. The method 1000 of including active advertiser accounts 132 created during the defined vetting interval in the plurality of active advertiser accounts 190 commences at 1002.

At 1004, the fraudulent advertiser account detection system 108, from time-to-time on a periodic or an aperiodic basis, autonomously includes at least some of the active advertiser accounts 132 created over the defined vetting interval in the plurality of active advertiser accounts 190. The method 1000 of including active advertiser accounts 132 created during the defined vetting interval in the plurality of active advertiser accounts 190 terminates at 1006.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in at least a portion of a system to detect at least one of fraudulent advertiser accounts or related advertiser account profiles suspected of being fraudulently generated, the system which includes at least one processor and at least one nontransitory processor-readable medium that stores at least one of processor-executable instructions or processor-executable data, the at least one nontransitory processor-readable medium communicatively coupled to the at least one processor, the method of operation comprising:

generating, by the at least one processor, a set of advertiser accounts including at least a plurality of known fraudulent advertiser accounts and a plurality of known valid advertiser accounts;

wherein each of the plurality of known fraudulent advertiser accounts and each of the plurality of known valid advertiser accounts has logically associated therewith a respective advertiser account profile that includes a number of advertiser account attributes; and wherein each of the number of advertiser account attributes has logically associated therewith at least one of a respective defined number of attribute values;

at regular or irregular intervals, determining by the at least one processor:

a value indicative of an initial probability of an advertiser account included in the set of advertiser accounts being at least one of a fraudulent advertiser account $[p(y=S)]$ or a valid advertiser account $[p(y=V)]$ based at least in part on: a number of known fraudulent advertiser accounts included in the set, a number of known valid advertiser accounts included in the set, and the total number of advertiser accounts included in the set;

for the attribute values or a combination of attribute values associated with at least some of the advertiser account profiles included in the set of advertiser accounts, a respective value indicative of a likelihood of the attribute values or the combination of attribute values being associated with at least one of a fraudulent advertiser account $[p(x_j^{(i)}|y=S)]$ or a valid advertiser account $[p(x_j^{(i)}|y=V)]$; and for each advertiser account in a plurality of active advertiser accounts, a conditional probability value $[p(y=S|x^{(i)}]$ indicative of a probability that the respective advertiser account is fraudulent based on attribute values or combinations of attribute values included in the respective advertiser account profile and determined using the respective determined initial probabilities and determined likelihoods;

designating, by the at least one processor, each active advertiser account with a respective determined conditional probability value at or above a defined first threshold value for removal from the plurality of active advertiser accounts;

designating, by the at least one processor, each active advertiser account with a respective determined conditional probability value at or below a defined second threshold value for retention in the plurality of active advertiser accounts;

designating, by the at least one processor, each active advertiser account with a respective determined conditional probability value falling between the defined first threshold value and the defined second threshold value for additional review; and at regular or irregular intervals, autonomously updating, by the at least one processor, the plurality of known fraudulent advertiser accounts included in the set of advertiser accounts to include at least some of the active advertiser accounts designated for removal from the plurality of active advertiser accounts by the at least one processor;

preventing advertisers that are autonomously identified as fraudulent or suspected fraudulent advertisers from supplying advertising on webpages;

attempting subsequent verification that the advertiser is not fraudulent; and reinstating the advertisers identified as fraudulent or suspected fraudulent advertisers to supply advertising on webpages if there is successful subsequent verification that the advertiser is not fraudulent.

2. The method of claim 1, further comprising:
at regular or irregular intervals, autonomously updating, by the at least one processor, the plurality of known valid advertiser accounts included in the set of advertiser accounts to include at least some of the active advertiser accounts designated for retention in the plurality of active advertiser accounts by the at least one processor.

3. The method of claim 1, further comprising:
at regular or irregular intervals, autonomously statistically analyzing, by the at least one processor, the distribution of conditional probability values falling between the defined first threshold and the defined second threshold to determine if a range of conditional probability values exists in which the advertiser accounts are more-likely-than not fraudulent.

4. The method of claim 3, further comprising:
at regular or irregular intervals, autonomously updating, by the at least one processor, the first defined threshold value to include at least a portion of the range of conditional probability values in which the advertiser accounts are more-likely-than not fraudulent.

5. The method of claim 1 wherein generating, by the at least one processor, the set of advertiser accounts including at least the plurality of known fraudulent advertiser accounts and the plurality of known valid advertiser accounts includes:
autonomously selecting, by the at least one processor, advertiser accounts for inclusion in the plurality of active advertiser accounts.

6. The method of claim 5 wherein autonomously selecting, by the at least one processor, advertiser accounts for inclusion in the plurality of active advertiser accounts includes:
autonomously excluding from the set of advertiser accounts, by the at least one processor, at least some advertiser accounts created during a defined vetting period immediately preceding the determination of the conditional probability values.

7. The method of claim 1 wherein autonomously selecting, by the at least one processor, advertiser accounts for inclusion in the plurality of active advertiser accounts further includes:
autonomously including in the plurality of active advertiser accounts, by the at least one processor, a number of active advertiser accounts created during a defined vetting period immediately preceding the determination of the conditional probability values.

8. The method of claim 1 wherein generating, by the at least one processor, the set of advertiser accounts having logically associated therewith a respective advertiser account profile that includes a number of advertiser account attributes, includes generating the set of account profiles that include one or more of the following advertiser account property-related attributes:
a corporate identity of the advertiser account;
a responsible party identity of the advertiser account;
an internet protocol (IP) creation address for the advertiser account;
an email domain of the advertiser account;
an cookie associated with the advertiser account;
an IP address country of the advertiser account;
an IP address state of the advertiser account;
a time zone offset of the advertiser account;
a session IP address of the advertiser account;
a time zone offset with the IP address country of the advertiser account;
a shared corporate entity name of the advertiser account;
an identity verification indicator of the advertiser account;
a payment method of the advertiser account; and
a payment detail of the advertiser account.

9. The method of claim 1 wherein generating, by the at least one processor, the set of advertiser accounts having logically associated therewith a respective advertiser account profile that includes a number of advertiser account attributes, includes generating the set of account profiles that include one or more of the following advertiser account behavior-related attributes:
a number of payment cards used to fund the advertiser account;
a deposit amount used to fund the advertiser account;
a number of payment cards used to fund the advertiser account and added over a defined time period;
a number of payment cards used in an attempt to fund the advertiser account and failing authorization over a defined time period;

a number of deposits used to fund the advertiser account over a defined time period;
an error code returned by a payment processor on a payment card used to fund the advertiser account;
an elapsed time interval between deposits used to fund the advertiser account;
a similarity between a payment cardholder first name and an advertiser's first name;
a similarity between a payment cardholder last name and an advertiser's last name;
a number of parties using a payment card having a common name, address, card number, and expiration date;
a total number of deposits into the advertiser account;
an increase in advertiser account balance; and
an elapsed time between advertiser account creation and a first deposit into the respective advertiser account.

10. The method of claim 1 wherein computing a value indicative of an initial probability of each of the advertiser accounts included in the set of advertiser accounts being at least one of a fraudulent advertiser account or a valid advertiser account includes:
computing both a value indicative of the initial probability of each respective advertiser account being fraudulent $[p(x_j^{(i)}|y=S)]$ and a value indicative of the initial probability of each respective advertiser account being valid $[p(x_j^{(i)}|y=V)]$.

11. The method of claim 1 wherein determining a respective value indicative of a likelihood of the attribute or the combination of attributes being associated with at least one of a fraudulent advertiser account includes computing the value $[p(x_j^{(i)}|y=S)]$ according to:

$$p(x_j^{(i)} | y = S) = \frac{\sum_{i=1}^{m} \sum_{k=1}^{p} 1\{x_{j,k}^{(i)}, y = S\} + 1}{\sum_{i=1}^{m} 1\{y^{(i)} = S\}p + |d_j|}.$$

12. The method of claim 11 wherein determining a respective value indicative of a likelihood of the attribute or the combination of attributes being associated with at least one of a fraudulent advertiser account includes computing the value $[p(x_j^{(i)}|y=V)]$ according to:

$$p(x_j^{(i)} | y = V) = \frac{\sum_{i=1}^{m} \sum_{k=1}^{p} 1\{x_{j,k}^{(i)}, y = V\} + 1}{\sum_{i=1}^{m} 1\{y^{(i)} = V\}p + |d_j|}.$$

13. The method of claim 12 wherein determining a respective value indicative of the conditional probability value indicative of the probability that the respective advertiser account is fraudulent includes computing the value $[p(y=S|x^{(i)})]$ according to:

$$p(y = S | x^{(i)}) = \frac{p(y = S)\prod_{j=1}^{n} p(x_j^{(i)} | y = S)}{p(y = S)\prod_{j=1}^{n} p(x_j^{(i)} | y = S) + p(y = V)\prod_{j=1}^{n} p(x_j^{(i)} | y = V)}.$$

14. The method of claim 1 wherein generating, by the at least one processor, the set of advertiser accounts including at least a plurality of known fraudulent advertiser accounts and a plurality of known valid advertiser accounts includes:
generating the set of advertiser accounts including at least the plurality of known fraudulent advertiser accounts and the plurality of known valid advertiser accounts, wherein the plurality of known valid advertiser accounts is not mutually exclusive with the plurality of active advertiser accounts.

15. The method of claim 14 wherein generating, by the at least one processor, the set of advertiser accounts including at least a plurality of known fraudulent advertiser accounts and a plurality of known valid advertiser accounts includes:
generating the set of advertiser accounts including at least the plurality of known fraudulent advertiser accounts and the plurality of known valid advertiser accounts, wherein the plurality of known fraudulent advertiser accounts is mutually exclusive with the plurality of active advertiser accounts.

16. A fraudulent advertiser account detection system to detect at least one of fraudulent advertiser accounts or related advertiser account profiles suspected of being fraudulently generated, the system comprising:
at least one processor; and
at least one nontransitory processor-readable medium that stores at least one of processor-executable instructions or processor-executable data permitting the at least one processor to provide a fraudulent advertiser account detection system, the at least one nontransitory processor-readable medium communicatively coupled to the at least one processor, wherein the at least one processor:
generates a set of advertiser accounts that includes at least a plurality of known fraudulent advertiser accounts and a plurality of known valid advertiser accounts;
wherein each of the plurality of known fraudulent advertiser accounts and each of the plurality of known valid advertiser accounts has logically associated therewith a respective advertiser account profile that includes a number of advertiser account profile attributes; and
wherein each of the number of advertiser account profile attributes has logically associated therewith at least one of a respective defined number of attribute values;
at regular or irregular intervals, determines:
a value indicative of an initial probability of an advertiser account included in the set of advertiser account profiles being at least one of a fraudulent advertiser account profile $[p(y=S)]$ or a valid advertiser account profile $[p(y=V)]$ based at least in part on: a number of fraudulent advertiser accounts included in the set, a number of known valid advertiser accounts included in the set, and the total number of advertiser accounts included in the set;
for at least some attribute values or combinations of attribute values associated with the profiles in the set of advertiser accounts, a respective value indicative of a likelihood of the respective attribute values or the combinations of attribute values being associated with at least one of a fraudulent advertiser account $[p(x_j^{(i)})|y=S)]$ or a valid advertiser account $[p(x_j^{(i)})|y=V)]$; and
for each advertiser account included in a plurality of active advertiser accounts, a conditional probability value $[p(y=S|x^{(i)})]$ indicative of a probability that the respective active advertiser account is fraudulent based on attribute values or combinations of attribute values included in the respective active advertiser account profile and determined using the respective determined initial probabilities and determined likelihoods;

designates those active advertiser accounts having a determined conditional probability value greater than or equal to a defined first threshold value for removal from the plurality of active advertiser accounts;

designates those active advertiser accounts having a determined conditional probability value less than or equal to a defined second threshold value for retention in the plurality of active advertiser accounts;

designates those active advertiser accounts having a determined conditional probability value falling between the defined first threshold value and the defined second threshold value for additional review;

at regular or irregular intervals, autonomously updates the plurality of known fraudulent advertiser accounts included in the set of advertiser accounts to include at least some of the active advertiser accounts designated for removal from the plurality of active advertiser accounts; and at regular or irregular intervals, autonomously updates the plurality of known valid advertiser accounts included in the set of advertiser accounts to include at least some of the active advertiser accounts designated for retention in the plurality of active advertiser accounts;

prevents advertisers that are autonomously identified as fraudulent or suspected fraudulent advertisers from supplying advertising on webpages;

attempts subsequent verification that the advertiser is not fraudulent; and reinstates the advertisers identified as fraudulent or suspected fraudulent advertisers to supply advertising on webpages if there is successful subsequent verification that the advertiser is not fraudulent.

17. The system of claim 16 wherein the at least one processor further:

at regular or irregular intervals, autonomously statistically analyzes the distribution of conditional probability values falling between the defined first threshold and the defined second threshold to determine if a range of conditional probability values exists in which the advertiser accounts are more-likely-than not fraudulent.

18. The system of claim 17 wherein the at least one processor further:

at regular or irregular intervals, autonomously updates the first defined threshold value to include at least a portion of the range of conditional probability values in which the advertiser accounts are more-likely-than not fraudulent.

19. The system of claim 16 wherein the at least one processor further:

autonomously selects advertiser accounts for inclusion in the set of advertiser accounts.

20. The system of claim 19 wherein the at least one processor further:

autonomously excludes from the set of advertiser accounts at least some advertiser accounts created during a defined vetting period immediately preceding the determination of the conditional probability values by the at least one processor.

21. The system of claim 16 wherein the at least one processor further:

autonomously includes in the plurality of active advertiser accounts at least some advertiser accounts created during the defined vetting period immediately preceding the determination by the at least one processor of the conditional probability values.

22. The system of claim 16 wherein the number of advertiser account profile attributes comprise a number of advertiser account properties, including at least one of:

a corporate identity of the advertiser account;

a responsible party identity of the advertiser account;

an internet protocol (IP) creation address for the advertiser account;

an email domain of the advertiser account;

an cookie associated with the advertiser account;

an IP address country of the advertiser account;

an IP address state of the advertiser account;

a time zone offset of the advertiser account;

a session IP address of the advertiser account;

a time zone offset with the IP address country of the advertiser account;

a shared corporate entity name of the advertiser account;

an identity verification indicator of the advertiser account;

a payment method of the advertiser account; and a payment detail of the advertiser account.

23. The system of claim 16 wherein the number of advertiser account profile attributes comprise a number of advertiser account behaviors including at least one of:

a number of payment cards used to fund the advertiser account;

a deposit amount used to fund the advertiser account;

a number of payment cards used to fund the advertiser account and added over a defined time period;

a number of payment cards used in an attempt to fund the advertiser account and failing authorization over a defined time period;

a number of deposits used to fund the advertiser account over a defined time period;

an error code returned by a payment processor on a payment card used to fund the advertiser account;

an elapsed time interval between deposits used to fund the advertiser account;

a similarity between a payment cardholder first name and an advertiser's first name;

a similarity between a payment cardholder last name and an advertiser's last name;

a number of parties using a payment card having a common name, address, card number, and expiration date;

a total number of deposits into the advertiser account;

an increase in advertiser account balance; and an elapsed time between advertiser account creation and a first deposit into the respective advertiser account.

24. The system of claim 16 wherein the at least one processor further:

for each of the advertiser accounts included in the set of advertiser accounts, computes both a value indicative of the initial probability of each respective advertiser account being fraudulent $[p(x_j^{(i)}|y=S)]$ and a value indicative of the initial probability of each respective advertiser account being valid $[p(x_j^{(i)}|y=V)]$.

25. The system of claim 24 wherein the at least one processor further: computes the value $[p(x_j^{(i)}|y=S)]$ according to:

$$p(x_j^{(i)} \mid y = S) = \frac{\sum_{i=1}^{m} \sum_{k=1}^{p} 1\{x_{j,k}^{(i)}, y = S\} + 1}{\sum_{i=1}^{m} 1\{y^{(i)} = S\} p + |d_j|}.$$

26. The system of claim 25 wherein the at least one processor further: computes the value $[p(x_j^{(i)} \mid y=V)]$ according to:

$$p(x_j^{(i)} \mid y = V) = \frac{\sum_{i=1}^{m} \sum_{k=1}^{p} 1\{x_{j,k}^{(i)}, y = V\} + 1}{\sum_{i=1}^{m} 1\{y^{(i)} = V\} p + |d_j|}.$$

27. The system of claim 26 wherein the at least one processor further: computes the value $[p(y=S \mid x^{(i)})]$ according to:

$$p(y = S \mid x^{(i)}) = \frac{p(y=S) \prod_{j=1}^{n} p(x_j^{(i)} \mid y = S)}{p(y=S) \prod_{j=1}^{n} p(x_j^{(i)} \mid y = S) + p(y=V) \prod_{j=1}^{n} p(x_j^{(i)} \mid y = V)}.$$

\* \* \* \* \*

UNITED STATES PATENT AND TRADEMARK OFFICE
CERTIFICATE OF CORRECTION

PATENT NO.         : 10,108,968 B1
APPLICATION NO.    : 14/638225
DATED              : October 23, 2018
INVENTOR(S)        : Fitsum Tekle et al.

Page 1 of 1

It is certified that error appears in the above-identified patent and that said Letters Patent is hereby corrected as shown below:

In the Claims

Column 35, Claim 1, Line 11:
"$[p(y = S|x^{(i)}]$" should read --$[p(y = S|x^{(i)})]$--.

Signed and Sealed this
Twentieth Day of August, 2019

Andrei Iancu
*Director of the United States Patent and Trademark Office*